US012658352B2

(12) United States Patent
Chang et al.

(10) Patent No.: US 12,658,352 B2

(45) Date of Patent: Jun. 16, 2026

(54) MAGNETIC ELEMENT

(71) Applicant: Delta Electronics, Inc., Taoyuan (TW)

(72) Inventors: Xueliang Chang, Taoyuan (TW); Da Jin, Taoyuan (TW); Yahong Xiong, Taoyuan (TW); Xiaodong Chen, Taoyuan (TW)

(73) Assignee: Delta Electronics, Inc., Taoyuan City (TW)

( * ) Notice: Subject to any disclaimer, the term of this patent is extended or adjusted under 35 U.S.C. 154(b) by 342 days.

(21) Appl. No.: 18/144,475

(22) Filed: May 8, 2023

(65) Prior Publication Data

US 2023/0274870 A1 Aug. 31, 2023

Related U.S. Application Data

(63) Continuation-in-part of application No. 17/400,347, filed on Aug. 12, 2021, now Pat. No. 11,749,442.

(30) Foreign Application Priority Data

Aug. 17, 2020 (CN) ......................... 202010825096.0

(51) Int. Cl.
*H01F 27/26* (2006.01)
*H01F 27/30* (2006.01)

(52) U.S. Cl.
CPC ........... *H01F 27/26* (2013.01); *H01F 27/306* (2013.01)

(58) Field of Classification Search
CPC ............................... H01F 27/26; H01F 27/306
See application file for complete search history.

(56) References Cited

U.S. PATENT DOCUMENTS

| | | | | |
|---|---|---|---|---|
| 10,389,258 | B2 | 8/2019 | Njiende et al. | |
| 10,498,245 | B2 | 12/2019 | Njiende et al. | |
| 11,749,442 | B2 * | 9/2023 | Chang | H02M 3/33576 363/21.01 |
| 2022/0006394 | A1 | 1/2022 | Jin et al. | |
| 2024/0047126 | A1 * | 2/2024 | Jin | H02M 3/33576 |

FOREIGN PATENT DOCUMENTS

| | | | | |
|---|---|---|---|---|
| CN | 101860235 A | | 10/2010 | |
| CN | 102364637 A | | 2/2012 | |
| CN | 106653334 A | | 5/2017 | |
| CN | 109067186 A | | 12/2018 | |
| CN | 109326419 A | | 2/2019 | |
| JP | H11231950 A | | 8/1999 | |
| JP | 2002025834 A | | 1/2002 | |
| JP | 2009123935 A | * | 6/2009 | H01F 30/06 |
| JP | 2012231585 A | | 11/2012 | |

* cited by examiner

*Primary Examiner* — Adolf D Berhane
(74) *Attorney, Agent, or Firm* — KIRTON McCONKIE; Evan R. Witt

(57) ABSTRACT

A magnetic element includes a magnetic core, at least one excitation winding and an auxiliary winding. The magnetic core includes at least one first magnetic leg, a second magnetic leg and a third magnetic leg. Each of the at least one magnetic leg is wound with an excitation winding, wherein a vector sum of magnetic flux passing through each of the at least one first magnetic leg is a first magnetic flux, a second magnetic flux is passing through the second magnetic leg, and a third magnetic flux is passing through the third magnetic leg. The auxiliary winding is partially or completely wound on the second magnetic leg, wherein the auxiliary winding is used to clamp the second magnetic flux.

14 Claims, 29 Drawing Sheets

MAGNETIC ELEMENT

CROSS-REFERENCE TO RELATED APPLICATION

This application is a continuation-in-part application of U.S. application Ser. No. 17/400,347 filed on Aug. 12, 2021 and entitled "MAGNETIC ELEMENT AND POWER MODULE WITH SAME", which claims priority to China Patent Application No. 202010825096.0, filed on Aug. 17, 2020. The entire contents of the above-mentioned patent applications are incorporated herein by reference for all purposes.

FIELD OF THE INVENTION

The present disclosure relates to a magnetic element, and more particularly to a magnetic element including a magnetic core with controllable magnetic flux.

BACKGROUND OF THE INVENTION

With the rapid development of Internet and artificial intelligence, the demands on the power modules with high efficiency and high power density are increasing. Generally, the power module is equipped with a magnetic element such as a transformer and an inductor. The structure of the magnetic element and the winding method of the winding coil are closely related to the efficiency and size of the power module and ultimately affect the power density and cost of the power module.

Nowadays, the magnetic element used in the power module includes a plurality of magnetic legs in order to reduce the loss and size. However, because of the distribution parameters, the magnetic flux of the magnetic element with a plurality of magnetic legs cannot be effectively controlled. Consequently, it is only possible to change the size of the specific part of the magnetic element in a more precise manner in order to control the magnetic flux through the adjustment of the magnetic flux path. However, since it is difficult to design the above magnetic element, the mass production is not feasible.

SUMMARY OF THE INVENTION

An object of the present disclosure provides a magnetic element in order to effectively control the magnetic flux.

In accordance with an embodiment of the present disclosure, a magnetic element is provided. The magnetic element includes a magnetic core, at least one excitation winding and an auxiliary winding. The magnetic core includes at least one first magnetic leg, a second magnetic leg and a third magnetic leg. Each of the at least one magnetic leg is wound with an excitation winding, wherein a vector sum of magnetic flux passing through each of the at least one first magnetic leg is a first magnetic flux, a second magnetic flux is passing through the second magnetic leg, and a third magnetic flux is passing through the third magnetic leg. The auxiliary winding is partially or completely wound on the second magnetic leg, wherein the auxiliary winding is used to clamp the second magnetic flux.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present disclosure provides a magnetic element with controllable magnetic flux distribution. The magnetic element includes at least one primary winding, at least one secondary winding, a magnetic core, and an auxiliary winding. At least one of a winding segment or an entire of the at least one primary winding and a winding segment or an entire of the at least one secondary winding are connected with each other and collaboratively defined as a parallel-connected winding set. In one embodiment, the parallel-connected winding set is defined by a winding segment or an entire of the at least one primary winding or a winding segment or an entire of the at least one secondary winding. The magnetic core includes a plurality of winding legs, a first lateral leg, a second lateral leg, a first connection part, and a second connection part. The plurality of winding legs, the first lateral leg, and the second lateral leg are arranged between the first connection part and the second connection part. The plurality of winding legs are sequentially arranged along a linear direction. The first lateral leg and the second lateral leg are respectively arranged on both sides of the plurality of winding legs. The at least one primary winding and the at least one secondary winding are wound around each winding leg. The directions of magnetic fluxes through each two adjacent winding legs are opposite. The auxiliary winding is wound on one of the first lateral leg and the second lateral leg, and electrically connected in parallel with the parallel-connected winding set. A turn ratio of the auxiliary winding to the parallel-connected winding set is N:1, wherein N is a positive value. A direction of a magnetic flux generated by the auxiliary winding is opposite to a direction of the magnetic flux through the adjacent winding leg. By the auxiliary winding wound on one of the lateral legs and the turn ratio of the auxiliary winding to the parallel-connected winding set, the magnetic potential of the lateral leg is clamped by the magnetic potential of the parallel-connected winding set. Consequently, the distribution of the AC magnetic flux in the magnetic element is controllable.

Figure 1:
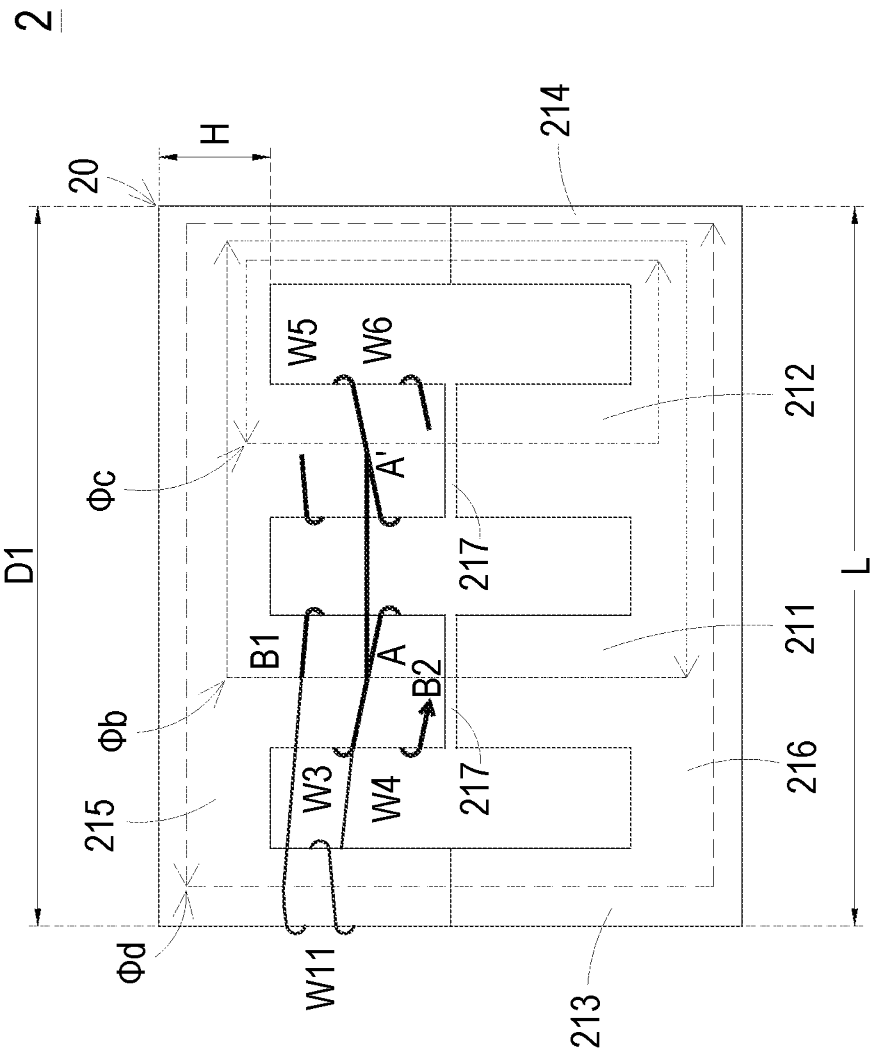
FIG. 1 is a schematic view illustrating the structure of a magnetic element according to a first embodiment of the present disclosure.
Figure 2:
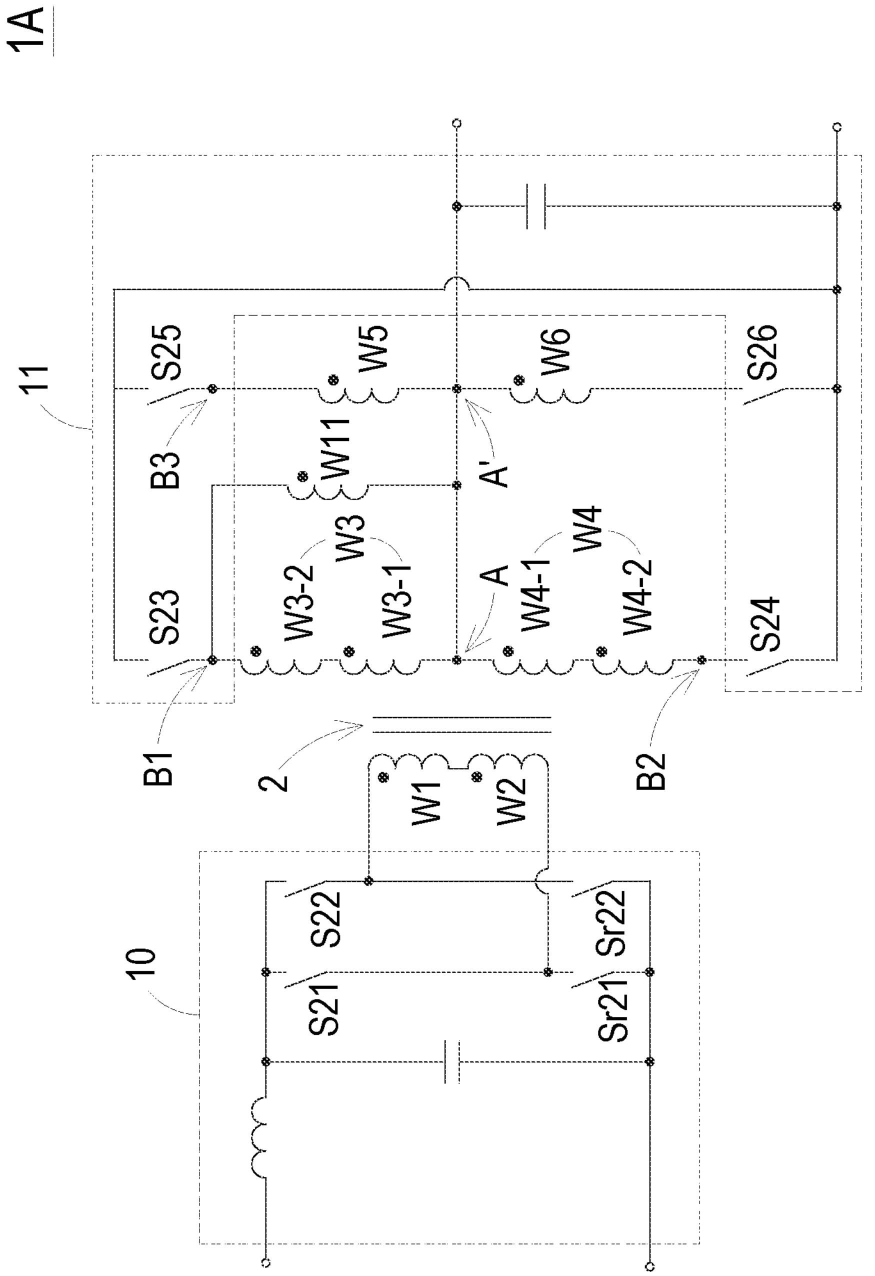
FIG. 2 is a schematic circuit diagram illustrating a power module with the magnetic element as shown in FIG. 1.
Figure 3:
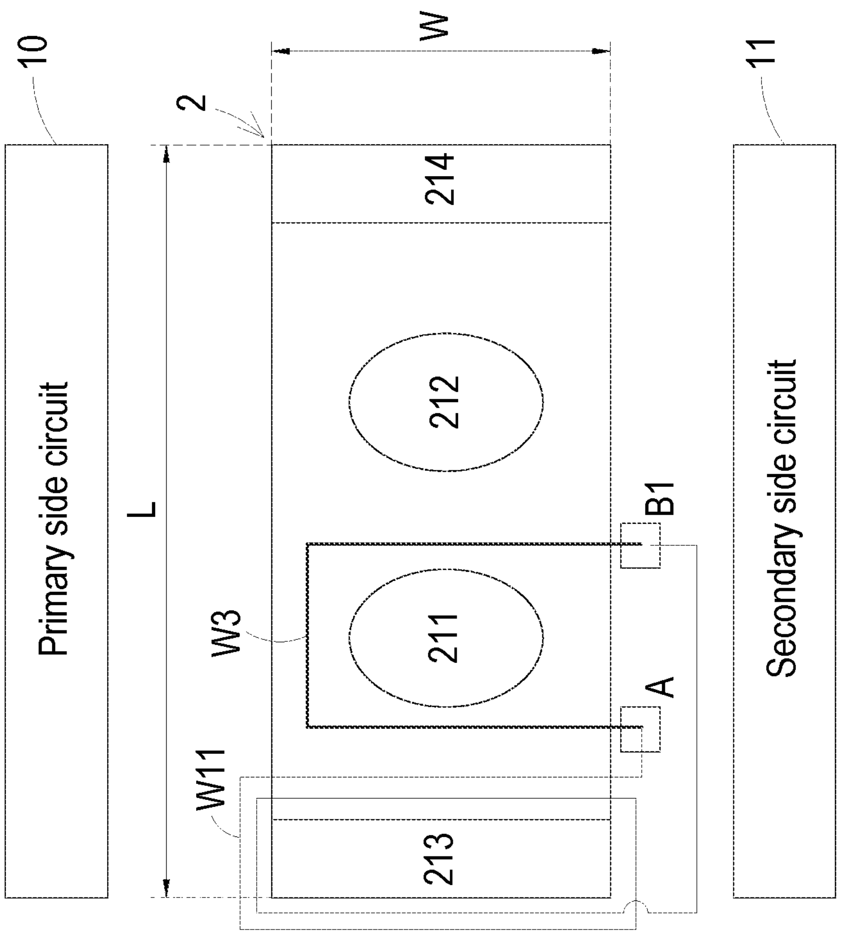
FIG. 3 schematically illustrates a winding method of the magnetic element as shown in FIG. 1.

Please refer to FIGS. 1, 2, and 3. FIG. 1 is a schematic view illustrating the structure of a magnetic element according to a first embodiment of the present disclosure. FIG. 2 is a schematic circuit diagram illustrating a power module with the magnetic element as shown in FIG. 1. FIG. 3 schematically illustrates a winding method of the magnetic element as shown in FIG. 1. Preferably but not exclusively, the magnetic element 2 may include a transformer. The magnetic element 2 may be applied to the power module 1A as shown in FIG. 2. In an embodiment, the power module 1A includes a primary side circuit 10, a magnetic element 2, and a secondary side circuit 11. The primary side circuit 10 includes four first switching units S21, S22, Sr21, and Sr22. The four first switching units S21, S22, Sr21, and Sr22 are collaboratively formed as a full-bridge circuit. The first switching unit S21 and the first switching unit Sr21 are connected with each other and collaboratively formed as a first bridge arm. The first switch unit S22 and the first switch unit Sr22 are connected with each other and collaboratively formed as a second bridge arm.

The magnetic element 2 includes a first primary winding W1, a second primary winding W2, a first group of secondary windings (W3, W4), a second group of secondary windings (W5, W6), and an auxiliary winding W11. The first primary winding W1 is electrically connected with the second primary winding W2 and the primary circuit 10. That is, the first primary winding W1 and the second primary winding W2 are connected between the midpoint of the first bridge arm and the midpoint of the second bridge arm. The first group of secondary windings (W3, W4) and the second group of secondary windings (W5, W6) are magnetically coupled with the first primary winding W1 and the second primary winding W2. The first group of secondary windings (W3, W4) includes a first secondary winding W3 and a second secondary winding W4 with a center-tapped structure. The second group of secondary windings (W5, W6) includes a third secondary winding W5 and a fourth secondary winding W6 with a center-tapped structure and is electrically connected in parallel with the first group of secondary windings (W3, W4). The first secondary winding W3 and the second secondary winding W4 are connected with a node A. The third secondary winding W5 and the fourth secondary winding W6 are connected with a node A'. In this embodiment, the first secondary winding W3 and the auxiliary winding W11 are connected with each other in parallel. In this context, the at least one winding that is electrically connected with the auxiliary winding W11 in parallel is defined as a parallel-connected winding set. The first terminal of the auxiliary winding W11 and the first terminal of the first secondary winding W3 are dotted terminals with the same polarity and electrically connected with the node B1. The second terminal of the auxiliary winding W11 and the second terminal of the first secondary winding W3 are connected with the node A. The ratio between the turn numbers of the auxiliary winding W11 and the first secondary winding W3 is N:1, where N is a positive integer, and preferably N is 2 in one embodiment. In the following example, N=2.

In this embodiment, the auxiliary winding W11 and the first secondary winding W3 are connected with each other in parallel. It is noted that numerous modifications and alterations may be made while retaining the teachings of the disclosure. For example, in another embodiment, the auxiliary winding W11 and another secondary winding are connected with each other in parallel.

In the embodiment, any one of the secondary windings may be divided into two winding segments. As shown in FIG. 2, the first secondary winding W3 is divided into a first winding segment W3-1 and a second winding segment W3-2, and the second secondary winding W4 is divided into a first winding segment W4-1 and a second winding segment W4-2. The auxiliary winding W11 is electrically connected with a portion of the parallel-connected winding set in parallel. That is, the auxiliary winding W11 may be electrically connected with a winding segment of the first secondary winding W3, for example the auxiliary winding W11 may be electrically connected with the first winding segment W3-1 or the second winding segment W3-2 of the first secondary winding W3. Alternatively, the auxiliary winding W11 may be electrically connected with a portion of the first secondary winding W3 and a portion of the first secondary winding W4 in parallel. The detail may be described with the figures hereinafter.

The secondary side circuit 11 is electrically connected with the first group of secondary windings (W3, W4) and the second group of secondary windings (W5, W6). The secondary side circuit 11 includes four second switching units S23, S24, S25, and S26. The second switching unit S23 is electrically connected with the first secondary winding W3. The second switching unit S24 is electrically connected with the second secondary winding W4. The second switching unit S25 is electrically connected with the third secondary winding W5. The second switching unit S26 is electrically connected with the fourth secondary winding W6. The first secondary winding W3 and the second switching unit S23 are electrically connected to the node B1. The second secondary winding W4 and the second switching unit S24 are electrically connected with the node B2. In some embodiments, the first group of secondary windings (W3, W4) and the second group of secondary windings (W5, W6) are electrically connected with each other in parallel, and the secondary side circuit 11 is electrically connected with the first group of secondary windings (W3, W4) and the second group of secondary windings (W5, W6). Consequently, the secondary side of the magnetic element 2 (i.e., transformer) of the power module 1A includes two center-tapped rectifier circuits to form two loops connected in parallel.

Please refer to FIG. 1 again. In order to better understand the technology of the present disclosure, the winding methods of the first primary winding W1 and the second primary winding W2 are not shown in FIG. 1. The magnetic element 2 includes a magnetic core 20. The magnetic core 20 includes a first winding leg 211, a second winding leg 212, a first lateral leg 213, a second lateral leg 214, a first connection part 215, and a second connection part 216. The first connection part 215 and the second connection part 216 are connected with the first winding leg 211, the second winding leg 212, the first lateral leg 213, and the second lateral leg 214. The first lateral leg 213 and the second lateral leg 214 are arranged between the first connection part 215 and the second connection part 216. In addition, the first lateral leg 213 and the second lateral leg 214 are arranged on both sides of the first winding leg 211 and the second winding leg 212, respectively. The first winding leg 211 and the second winding leg 212 are arranged between the first lateral leg 213 and the second lateral leg 214. Moreover, the first winding leg 211 and the second winding leg 212 are separated from the first lateral leg 213 and the second lateral leg 214 at a specified distance. In other words, the first lateral leg 213, the first winding leg 211, the second winding leg 212, and the second lateral leg 214 are sequentially arranged along the linear direction D1. In this embodiment, at least one virtual line passes through the first winding leg 211 and the second winding leg 212. As shown in FIG. 1, each of the first connection part 215 and the second connection part 216 has a length L, a width W (see FIG. 3) and a height H. The linear direction D1 is in parallel with the length direction of the magnetic core 20. Moreover, the first connection part 215 and the second connection part 216 are divided into three sections by the first winding leg 211, the second winding leg 212, the first lateral leg 213, and the second lateral leg 214. The first section is approximately arranged between the first lateral leg 213 and the first winding leg 211. The second section is approximately arranged between the first winding leg 211 and the second winding leg 212. The third section is approximately arranged between the second winding leg 212 and the second lateral leg 214.

In some embodiments, each of the first winding leg 211 and the second winding leg 212 includes a first air gap 217, and the first lateral leg 213 and the second lateral leg 214 may not be equipped with air gaps. In some other embodiments, each of the first winding leg 211 and the second winding leg 212 includes a first air gap 217, and each of the first lateral leg 213 and the second lateral leg 214 may be equipped with a second air gap (not shown). The height of the second air gap may be smaller than $1/10$ of the height of the first air gap 217. Moreover, the turn numbers of the first secondary winding W3, the second secondary winding W4, the third secondary winding W5, and the fourth secondary winding W6 may be equal.

In an embodiment, the first secondary winding W3 and the second secondary winding W4 are wound on the first winding leg 211 in the same winding direction (e.g., in the counterclockwise direction as shown in FIG. 1). Moreover, the first secondary winding W3 and the second secondary winding W4 are electrically connected with the node A. The AC magnetic flux generated by the first secondary winding W3 and the second secondary winding W4 on the first winding leg 211 is Ob. The third secondary winding W5 and the fourth secondary winding W6 are wound on the second winding leg 212 in the same winding direction (e.g., in the clockwise direction). Moreover, the third secondary winding W5 and the fourth secondary winding W6 are electrically connected to the node A'. The node A and the node A' are electrically connected through an external wire or a trace on a printed circuit board of the power module 1A. The AC magnetic flux generated by the third secondary winding W5 and the fourth secondary winding W6 on the second winding leg 212 is Φc. The auxiliary winding W11 is wound on the first lateral leg 213 in a clockwise direction for example. Moreover, the auxiliary winding W11 is electrically connected with the first secondary winding W3 in parallel. The terminal voltage of the auxiliary winding W11 is clamped by the terminal voltage of the first secondary winding W3. The AC magnetic flux generated by the auxiliary winding W11 on the first lateral leg 213 is Φd. According to the winding direction, the direction of the AC magnetic flux Φc is the same as the direction of the AC magnetic flux Φd, and the direction of AC magnetic flux Φb is opposite to the direction of the AC magnetic flux Φc and the direction of the AC magnetic flux Φd. As mentioned above, each of the first winding leg 211 and the second winding leg 212 includes a first air gap 217, and the first lateral leg 213 and the second lateral leg 214 are not equipped with air gaps. Alternatively, each of the first winding leg 211 and the second winding leg 212 includes a first air gap 217, and each of the first lateral leg 213 and the second lateral leg 214 is equipped with a second air gap (not shown). The height of the second air gap is smaller than $1/10$ of the height of the first air gap 217. Consequently, all of the AC magnetic fluxes Φb, Φc, and Φd flow to the second lateral leg 214.

In an embodiment, the ratio between the turn numbers of the auxiliary winding W11 and the first secondary winding W3 is 2:1. Consequently, the relationship between the AC magnetic flux Φd and the AC magnetic flux Φb may be expressed as: $\Phi d=\Phi b/2$.

The AC magnetic flux Φb is equal to the AC magnetic flux Φc. If the direction of the magnetic flux is not considered, the AC magnetic flux flowing through the second lateral leg 214 is $\Phi c+\Phi d-\Phi b=\Phi d/2$. Consequently, the cross-sectional area of the first lateral leg 213 perpendicular to the height H (i.e., along the linear direction D1) is a half of the cross-sectional area of the first winding leg 211 (or the second winding leg 212) perpendicular to the height H. Similarly, the cross-sectional area of the second lateral leg 214 perpendicular to the height H (i.e., along the linear direction D1) is a half of the cross-sectional area of the first winding leg 211 (or the second winding leg 212) perpendicular to the height H.

Moreover, the AC magnetic flux flowing in the first section of the first connection part 215 and the second connection part 216 is Φd, the AC magnetic flux flowing in the second section is Φb−Φd (i.e., =Φd), and the AC magnetic flux flowing in the third section is Φc+Φd−Φb (i.e., =Φd). In other words, the AC magnetic flux flowing through the first connection part 215 and the second connection part 216 of the magnetic element 2 is reduced. Due to the arrangement of the auxiliary winding W11, the AC magnetic flux of the first lateral leg 213 is equal to the AC magnetic flux of the second lateral leg 214. Consequently, the AC magnetic flux flowing through each part of the magnetic element 2 is controllable, and the magnetic element 2 can be designed in a simplified manner. In such way, the magnetic element 2 is suitable for mass production while maintaining the performance consistency.

Please refer to FIG. 3. In FIG. 3, only the winding methods of the first secondary winding W3 and the auxiliary winding W11 are shown. In case that the first secondary winding W3 is wound on the first winding leg 211 in a counterclockwise direction, the auxiliary winding W11 is wound on the first lateral leg 213 in a clockwise direction. The auxiliary winding W11 and the first secondary winding W3 are electrically connected in parallel and connected between the node A and the node B1. As mentioned above, the ratio between the turn number of the auxiliary winding W11 and the turn number of the first secondary winding W3 is N:1, where N is a positive integer. As shown in FIG. 3, the turn number of the first secondary winding W3 is 1, and the turn number of the auxiliary winding W11 is 2.

In some embodiments, the power transferred through the auxiliary winding W11 may be equal to or lower than 50% of the total power transferred through the magnetic element 2. All mentioned embodiments of the present disclosure may be applicable under this condition. The winding widths of the first secondary winding W3 and the auxiliary winding W11 may be designed according to practical requirements. According to the design, the winding width of the auxiliary winding W11 may be much smaller than the winding width of the first secondary winding W3. Consequently, the equivalent excitation inductance of the auxiliary winding W11 may be much lower than the equivalent excitation inductance of the first secondary winding W3. In such way, a greater portion of the power is transferred to the output side of the power module 1A through the first secondary winding W3. In some other embodiments, the winding width of the auxiliary winding W11 may be properly increased as long as the winding width of the auxiliary winding W11 is smaller than the winding width of the first secondary winding W3. Consequently, a portion of the energy can be transferred through the auxiliary winding W11. In other words, the winding width of the auxiliary winding W11 can be designed according to the principle of energy distribution.

As mentioned above, the ratio between turn numbers of the auxiliary winding W11 and the first secondary winding W3 is N:1, where N is a positive integer. In some embodiments, N may be larger than 2. That is, the turn number of the first secondary winding W3 is 1, and the turn number of the auxiliary winding W11 is N. The winding direction and the generated AC magnetic flux are identical to those of FIG. 1. In this case, the AC magnetic flux generated by the auxiliary winding W11 on the first lateral leg 211 is Φd=Φb/N. Consequently, the distribution of the AC magnetic flux in the magnetic element is different from that of the previous embodiment. Consequently, the AC magnetic flux flowing through each part of the magnetic element 2 is controllable, and the performance consistency is enhanced.

In some embodiments, the first primary winding W1 is wound on the first winding leg 211. The second primary winding W2 is wound on the second winding leg 212. The terminal voltages of the first primary winding W1 and the second primary winding W2 are AC voltages. The direction of the AC magnetic flux generated by the first primary winding W1 is opposite to the direction of the AC magnetic flux generated by the second primary winding W2. The turn number of the first primary winding W1 and the turn number of the second primary winding W2 may be equal. Preferably but not exclusively, the first primary winding W1, the second primary winding W2, the first group of secondary windings (W3, W4), the second group of secondary windings (W5, W6) and the auxiliary winding W11 are planer PCB windings. All disclosed embodiments of the present disclosure may be applicable under this condition.

Please refer to FIG. 3 again. The primary side circuit 10 of the power module 1A is located on a first side of the magnetic element 2 along the length direction. The secondary side circuit 11 of the power module 1A is located on a second side of the magnetic element 2 along the length direction. The arrangements of the first side circuit, the second side circuit and the magnetic element in the power modules of the following embodiments are similar to that of the embodiment as sown in FIG. 3.

Figure 4:
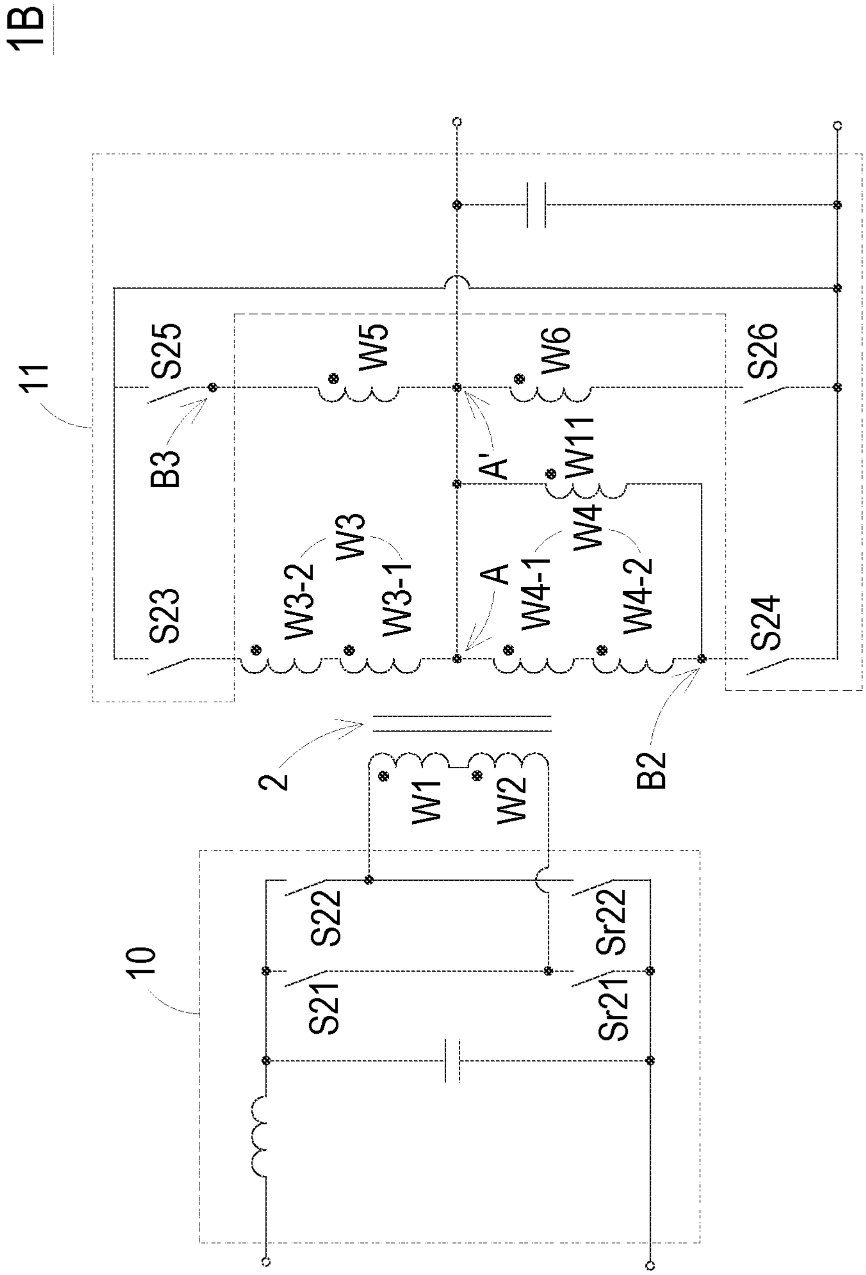
FIG. 4 is a schematic circuit diagram illustrating a power module according to a second embodiment of the present disclosure.

FIG. 4 is a schematic circuit diagram illustrating a power module according to a second embodiment of the present disclosure. In comparison with the power module 1A of the first embodiment as shown in FIG. 2, the auxiliary winding W11 of the magnetic element 2 in the power module 1B of this embodiment is electrically connected with the second secondary winding W4 in parallel. That is, one terminal of the auxiliary winding W11 is electrically connected with the node A, and the other terminal of the auxiliary winding W11 is electrically connected with the node B2.

Figure 5:
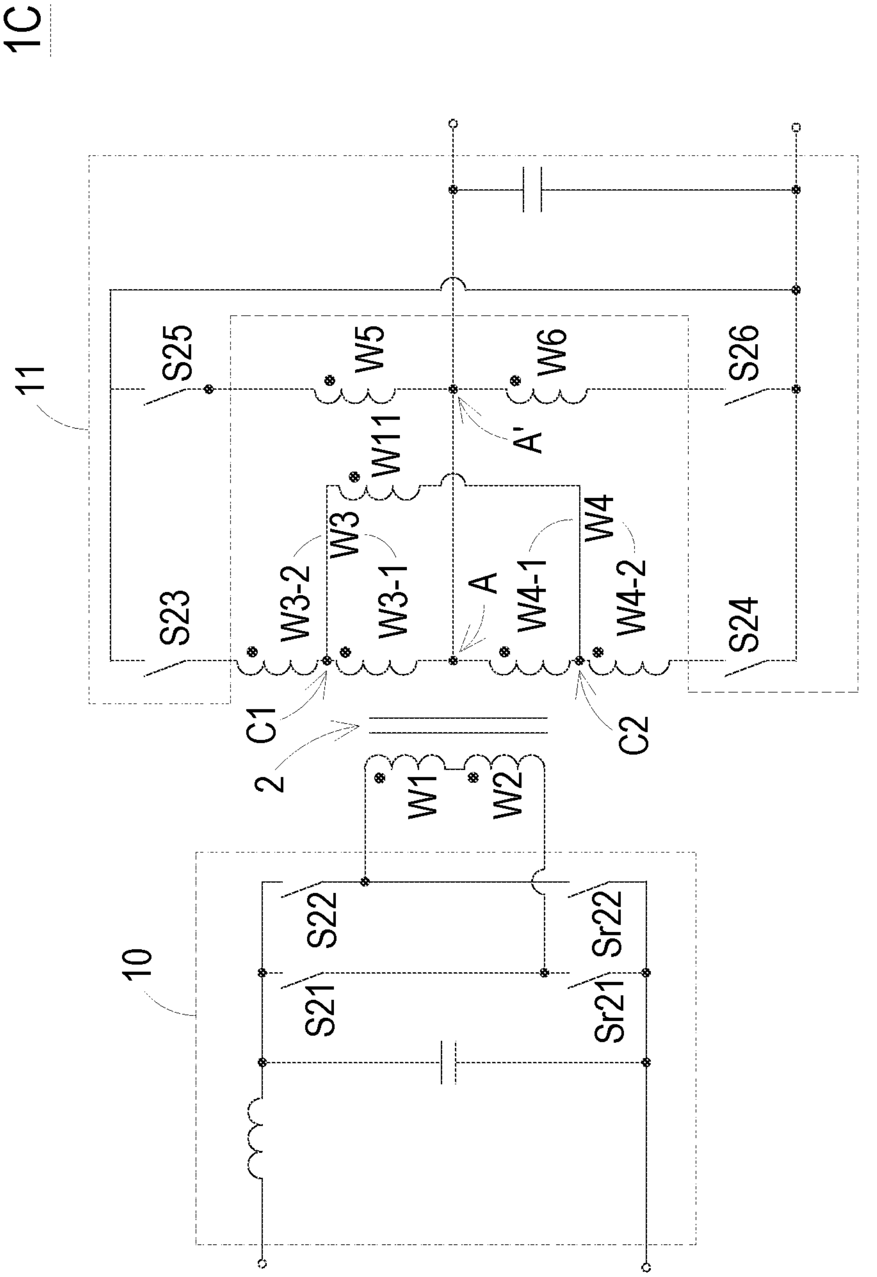
FIG. 5 is a schematic circuit diagram illustrating a power module according to a third embodiment of the present disclosure.

FIG. 5 is a schematic circuit diagram illustrating a power module according to a third embodiment of the present disclosure. In comparison with the power module 1A of the first embodiment as shown in FIG. 2, the auxiliary winding W11 of the magnetic element 2 in the power module 1C of this embodiment is electrically connected with a portion of the first secondary winding W3 and a portion of the second secondary winding W4 in parallel. That is, one terminal of the auxiliary winding W11 is electrically connected with the node C1, and the other terminal of the auxiliary winding W11 is electrically connected with the node C2. That is, the auxiliary winding W11 is electrically connected with the first winding segment W4-1 of the second secondary winding W4 and the first winding segment W3-1 of the first secondary winding W3 in parallel. The ratio between the turn number of the auxiliary winding W11 and the total turn number of the winding segments W4-1 and W3-1 is N:1. The winding direction of the auxiliary winding W11 can be wound on the first lateral leg 213 or the second lateral leg 214 with reference to FIGS. 1 and 3. The winding method is not restricted. That is, the winding method may be determined according to the practical requirements. For example, the winding methods of the winding segments W4-1 and W3-1 are identical.

In some embodiments, the auxiliary winding W11 is electrically connected with the third secondary winding W5 in parallel. In this case, the auxiliary winding W11 is wound on the second lateral leg 214 and located beside the third secondary winding W5. The operating principle is similar to that of FIG. 1.

Figure 6:
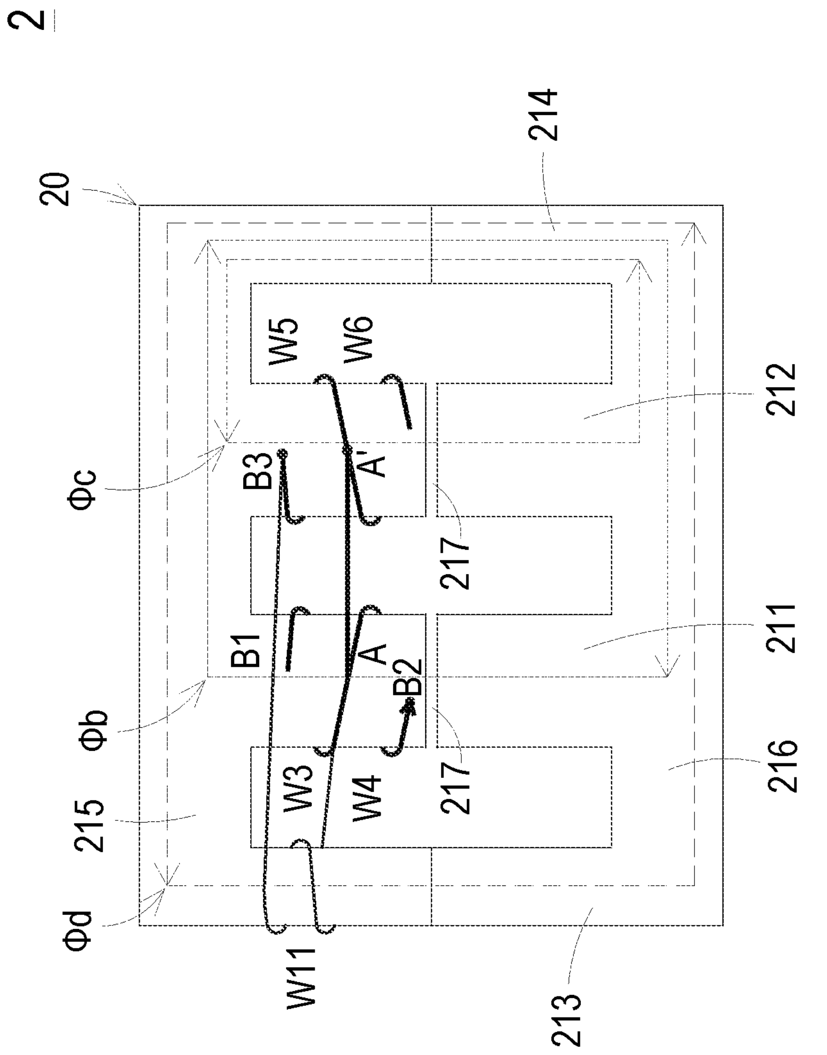
FIG. 6 is a schematic view illustrating the structure of another exemplary magnetic element.
Figure 7:
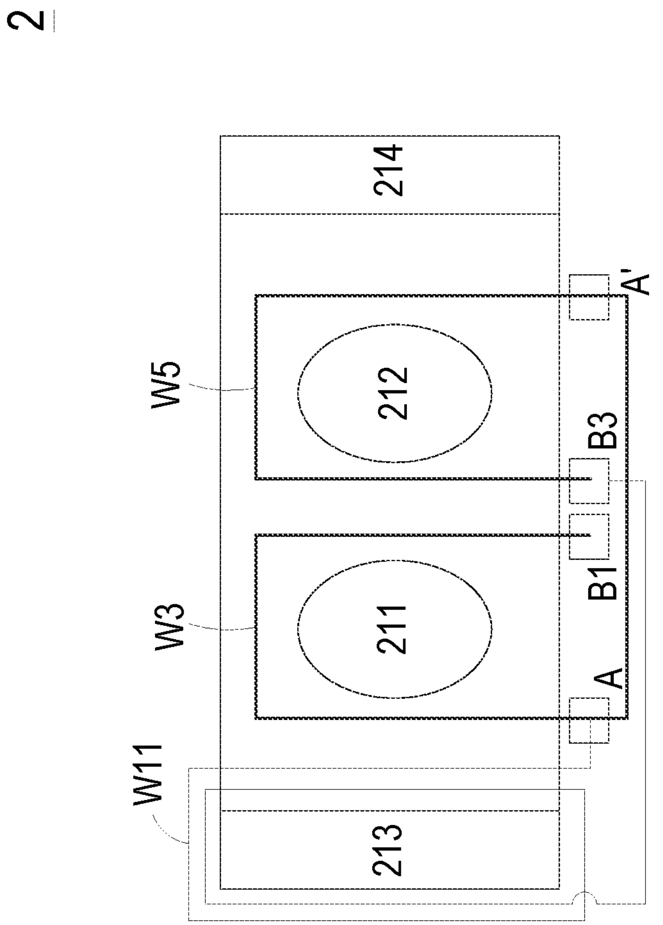
FIG. 7 schematically illustrates a winding method of the magnetic element as shown in FIG. 6.

In some other embodiments, the third secondary winding W5 is wound on the second winding leg 212, and the auxiliary winding W11 is wound on the first lateral leg 213, which is far from the second winding leg 212. Please refer to FIGS. 6 and 7. FIG. 6 is a schematic view illustrating the structure of another exemplary magnetic element. FIG. 7 schematically illustrates a winding method of the magnetic element as shown in FIG. 6. In this embodiment, the auxiliary winding W11 and the third secondary winding W5 are electrically connected with each other in parallel. The auxiliary winding W11 is wound on the first lateral leg 213. The third secondary winding W5 is wound on the second winding leg 212. Moreover, one terminal of the auxiliary winding W11 and the third secondary winding W5 are electrically connected with the node B3 (see FIG. 2), and the other terminal of the auxiliary winding W11 and the third secondary winding W5 are electrically connected with the node A'. The winding direction of the auxiliary winding W11 is identical to the winding direction of the third secondary winding W5. Moreover, the direction of the magnetic flux on the first lateral leg 213 is identical to the direction of the magnetic flux on the second winding leg 212, but opposite to the direction of the magnetic flux on the adjacent first winding leg 211.

Figure 8:
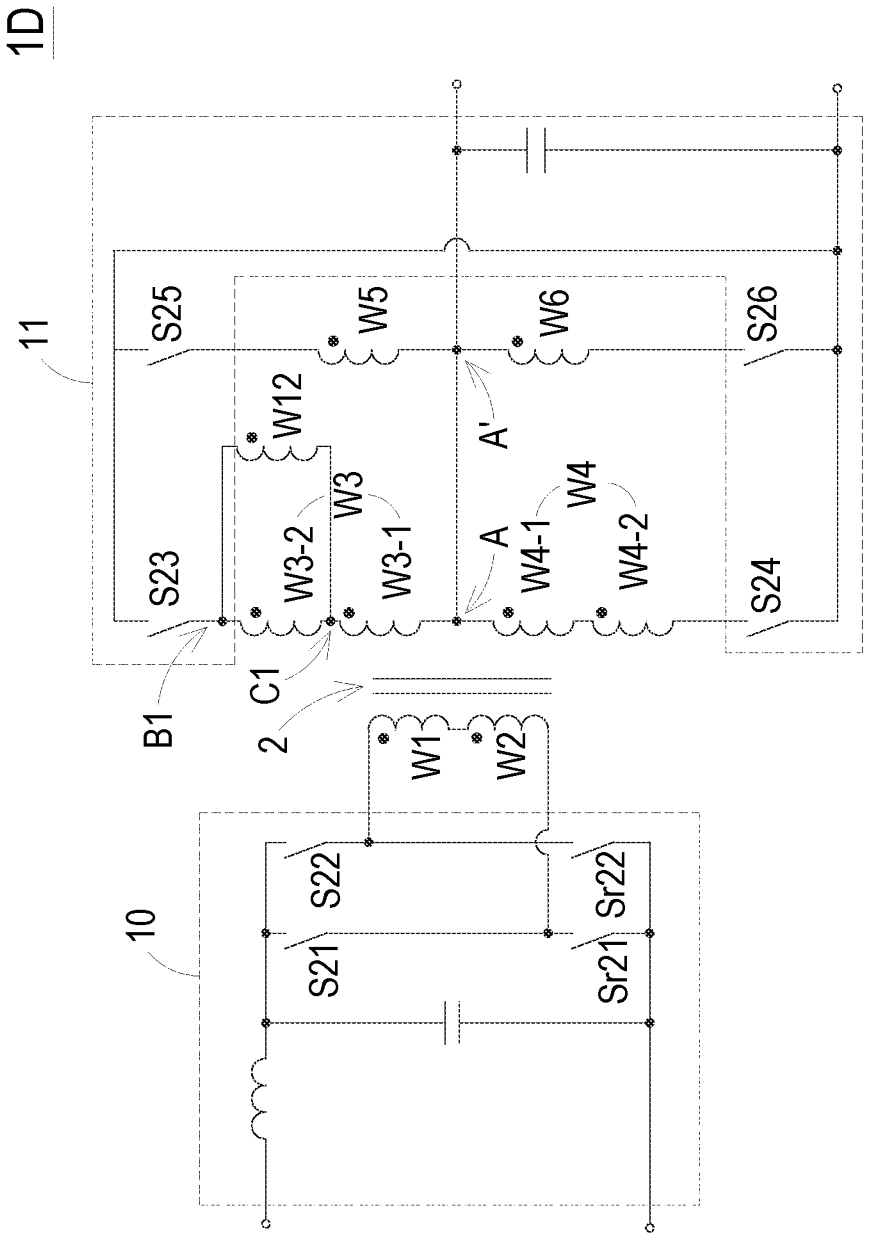
FIG. 8 is a schematic circuit diagram illustrating a power module according to a fourth embodiment of the present disclosure.
Figure 9:
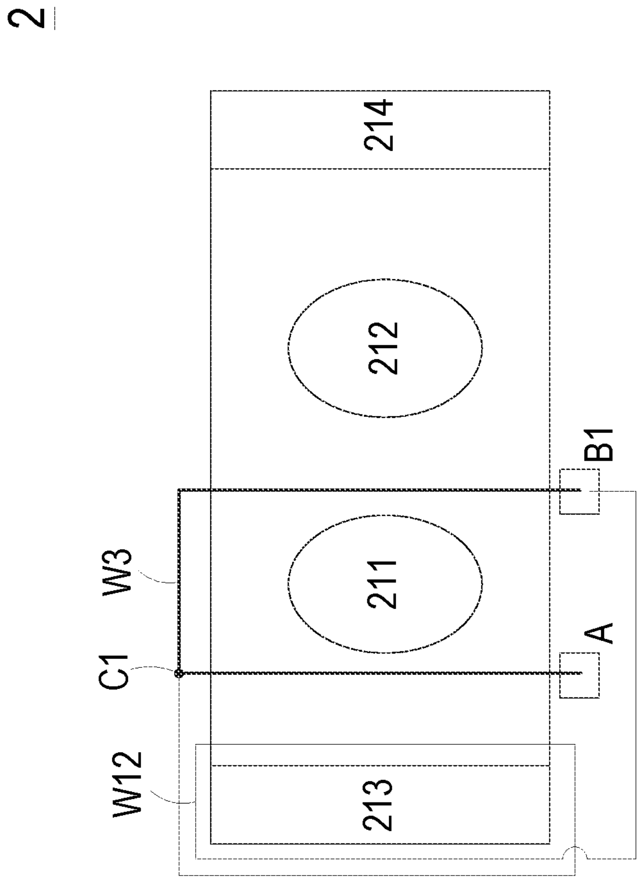
FIG. 9 schematically illustrates a winding method of the magnetic element as shown in FIG. 8.

In some embodiments, the auxiliary winding W11 is electrically connected with a winding segment of any secondary winding in parallel. Please refer to FIGS. 8 and 9. FIG. 8 is a schematic circuit diagram illustrating a power module according to a fourth embodiment of the present disclosure. FIG. 9 schematically illustrates a winding method of the magnetic element as shown in FIG. 8. In the magnetic element 2 of the power module 1D, the auxiliary winding W12 is electrically connected with the second winding segment W3-2 of the first secondary winding W3 in parallel. That is, one terminal of the auxiliary winding W12 is electrically connected with the node B1, and the other terminal of the auxiliary winding W12 is electrically connected with the node C1. The ratio between the turn number of the auxiliary winding W12 and the turn number of the winding segment W3-2 is N:1, wherein the auxiliary winding W12 and the winding segment W3-2 is defined as a parallel-connected winding set, and N is a positive integer. In this embodiment, the ratio between the turn number of the auxiliary winding W12 and the turn number of the first winding segment W3-2 is 2:1, and the turn number of the first secondary winding W3 is 1. In case that the first secondary winding W3 is wound on the first winding leg 211 in a counterclockwise direction, the auxiliary winding W12 is wound on the first lateral leg 213 in a clockwise direction. Moreover, one terminal of the auxiliary winding W12 and the second winding segment W3-2 of the first secondary winding W3 are electrically connected with the node C1, and the other terminal of the auxiliary winding W12 and the second winding segment W3-2 of the first secondary winding W3 are electrically connected with the node B1. Moreover, the auxiliary winding W12 is electrically connected with the second winding segment W3-2 of the first secondary winding W3 in parallel. The terminal voltage of the auxiliary winding W12 is clamped by the terminal voltage of the second winding segment W3-2 of the first secondary winding W3. Since the magnetic potential of the first lateral leg 213 is clamped, the distribution of the AC magnetic flux in the magnetic element 2 is controllable.

In some other embodiments, the auxiliary winding W12 is electrically connected with the winding segment of another secondary winding in parallel. For example, the auxiliary winding W12 is electrically connected with the first winding segment W3-1, the first winding segment W4-1 or the second winding segment W4-2 in parallel. Alternatively, the auxiliary winding W12 is electrically connected with the winding segment of the third secondary winding W5 or the winding segment of the fourth secondary winding W6 in parallel. Alternatively, the auxiliary winding W12 is wound on the second lateral leg 214 according to the practical requirements. The winding method can be referred to FIGS. 8 and 9. The winding direction of the auxiliary winding on the lateral leg and the winding direction of the secondary winding on the adjacent winding leg are opposite. Moreover, the ratio between the turn number of the auxiliary winding and the turn number of the winding segment of the secondary winding is N:1, wherein N is a positive integer.

In some other embodiments, the auxiliary winding is electrically connected with any primary winding or a winding segment of any primary winding in parallel.

Figure 10:
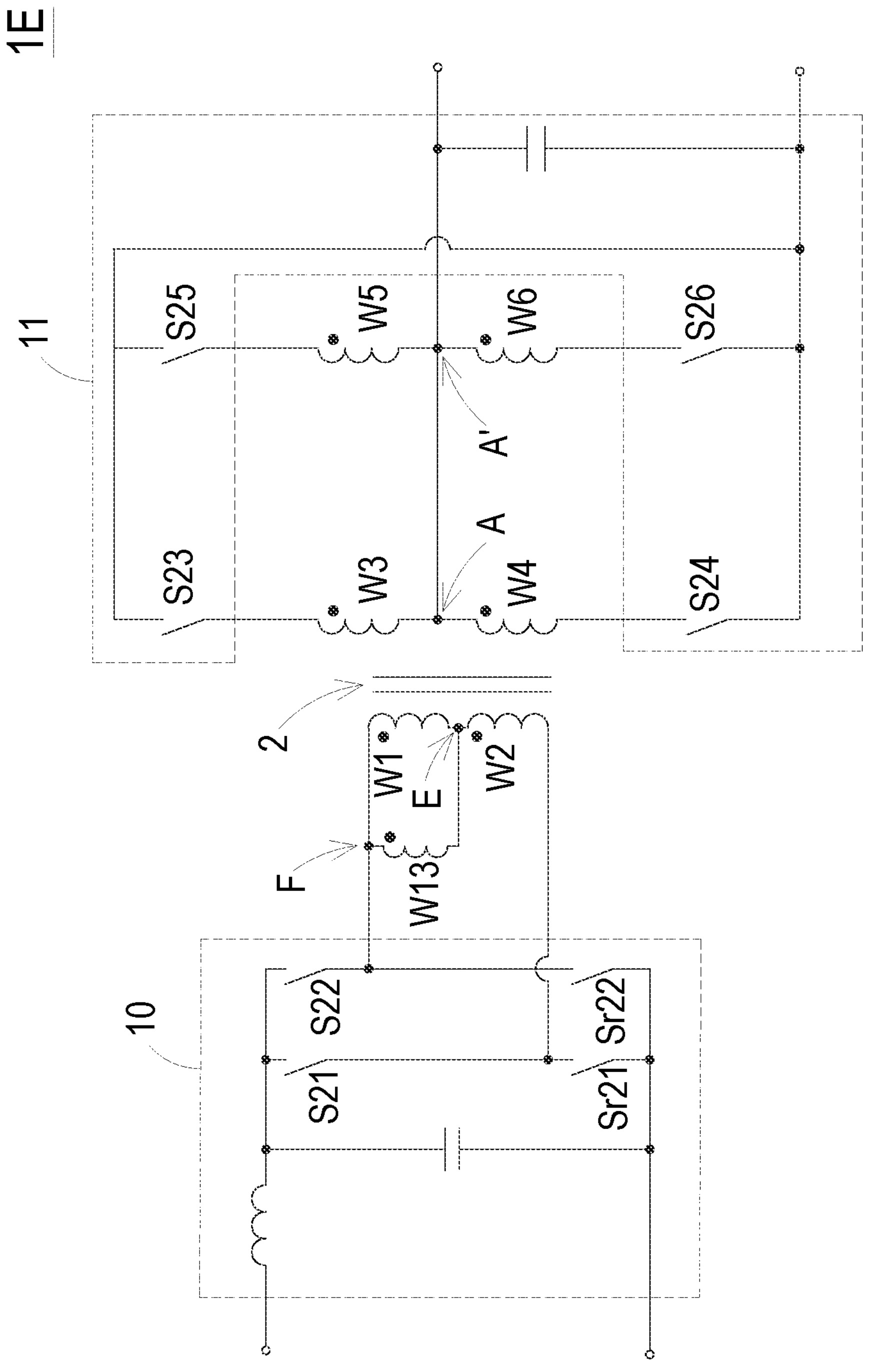
FIG. 10 is a schematic circuit diagram illustrating a power module according to a fifth embodiment of the present disclosure.

FIG. 10 is a schematic circuit diagram illustrating a power module according to a fifth embodiment of the present disclosure. In comparison with the above embodiments, the auxiliary winding W13 of the magnetic element 2 in the power module 1E of this embodiment is electrically connected with the first primary winding W1 in parallel. That is, the two terminals of the auxiliary winding W13 and the two terminals of the first primary winding W1 are connected with the node E and the node F, respectively. Moreover, the ratio between the turn number of the auxiliary winding 13 and the turn number of the first primary winding W1 is N:1, wherein N is a positive integer.

Figure 11:
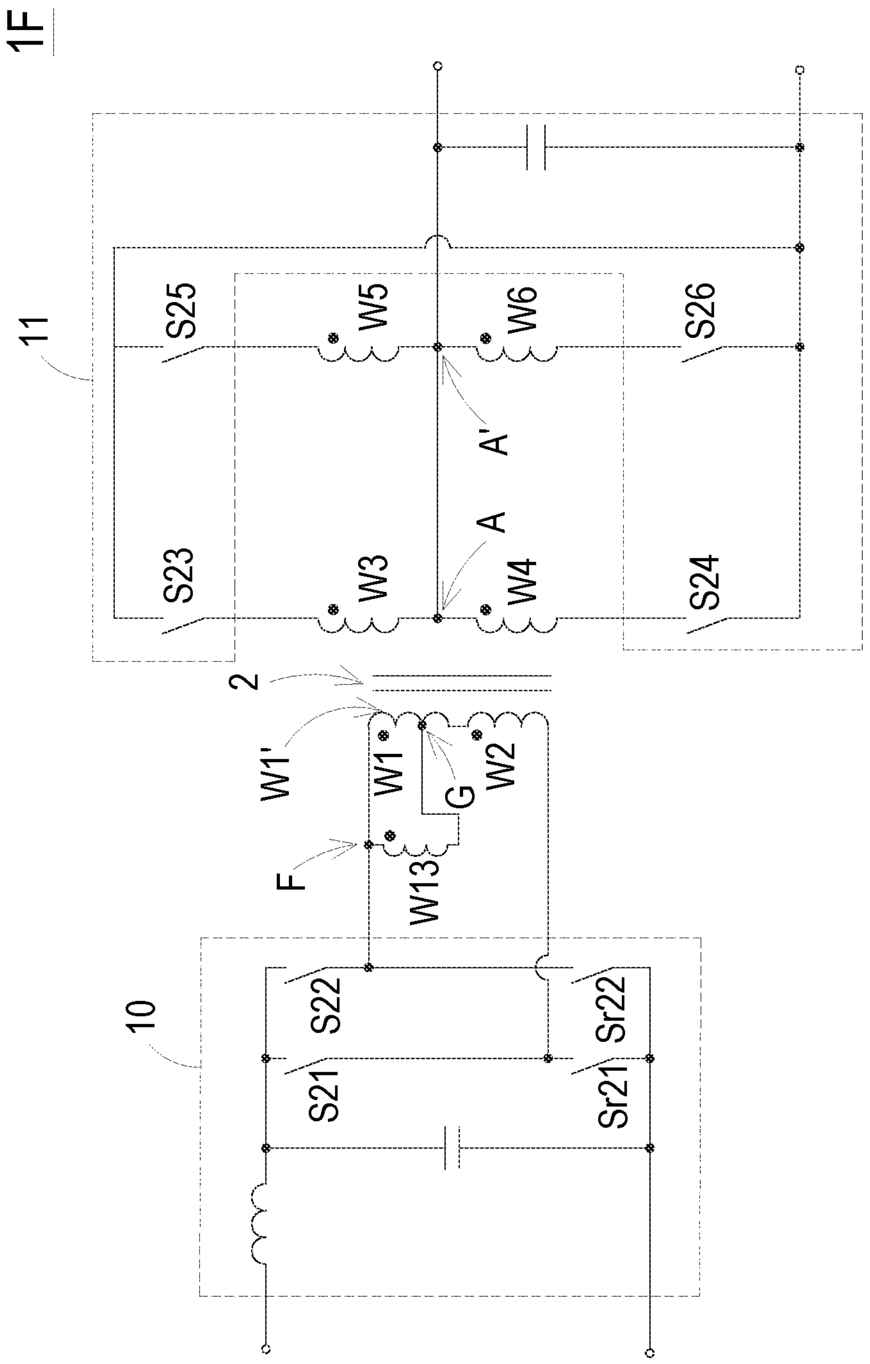
FIG. 11 is a schematic circuit diagram illustrating a power module according to a sixth embodiment of the present disclosure.
Figure 12:
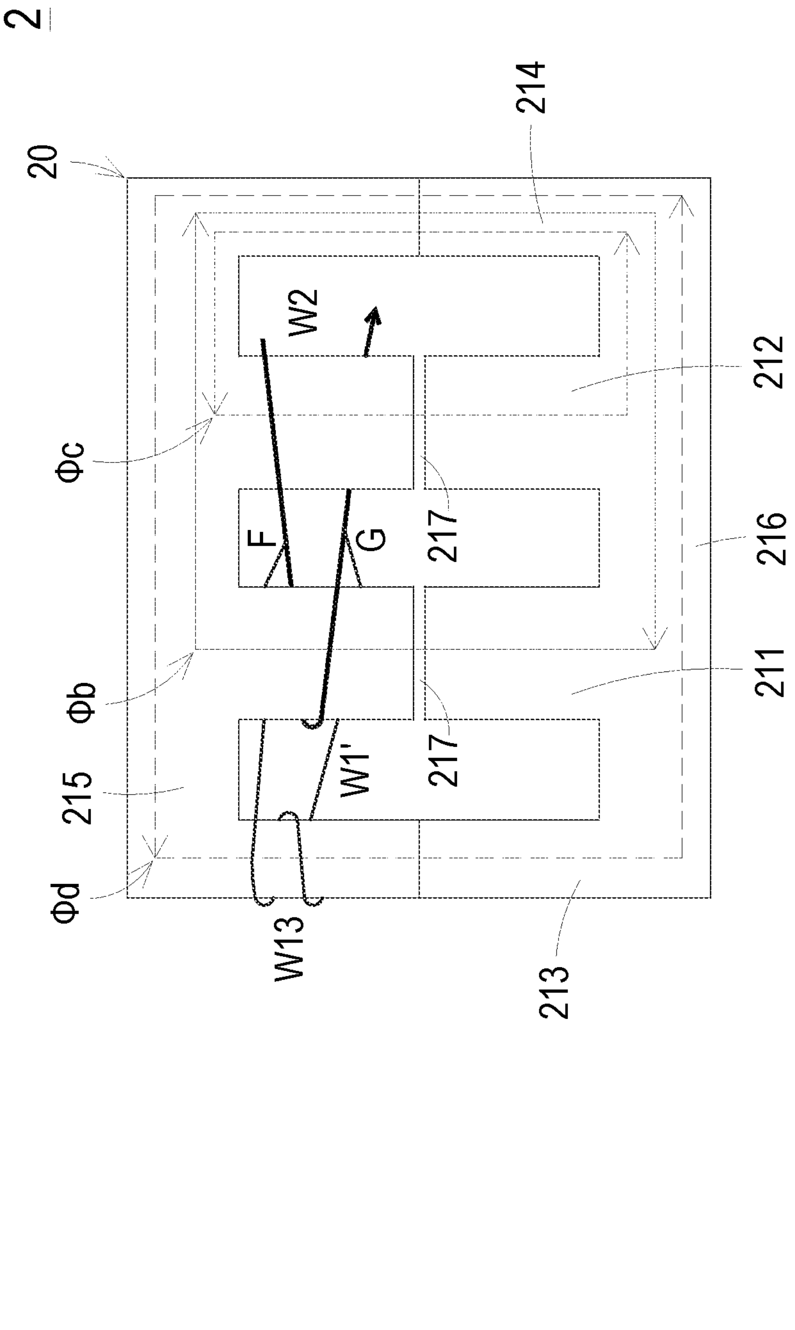
FIG. 12 is a schematic view illustrating the structure of a magnetic element of the power module as shown in FIG. 11.
Figure 13:
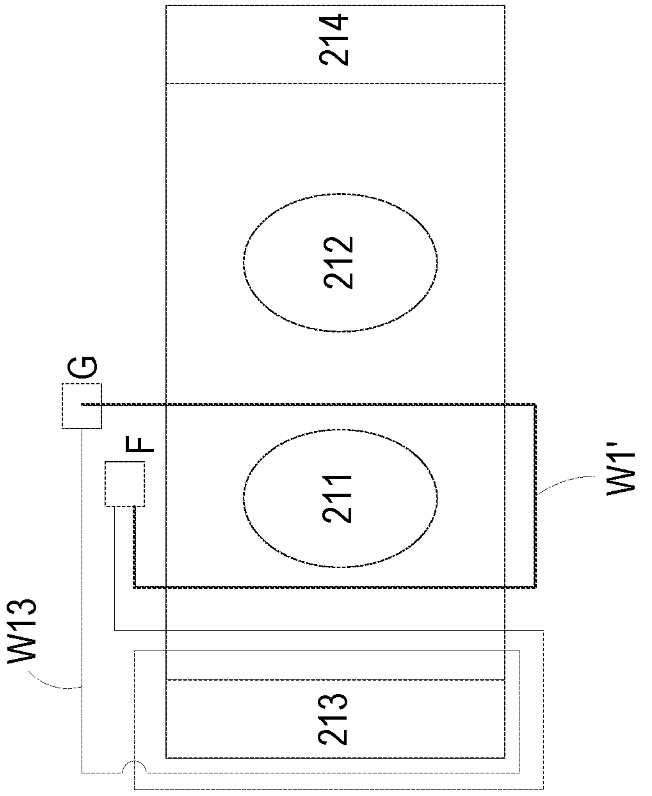
FIG. 13 schematically illustrates a winding method of the magnetic element as shown in FIG. 12.

Please refer to FIGS. 11, 12, and 13. FIG. 11 is a schematic circuit diagram illustrating a power module according to a sixth embodiment of the present disclosure. FIG. 12 is a schematic view illustrating the structure of a magnetic element of the power module as shown in FIG. 11. FIG. 13 schematically illustrates a winding method of the magnetic element as shown in FIG. 12. The auxiliary winding W13 of the magnetic element 2 in the power module 1F of this embodiment is electrically connected with the winding segment W1' of the first primary winding W1 in parallel, wherein the winding segment W1' of the first primary winding W1 is defined by dividing the first primary winding W1 at the node G. That is, the two terminals of the auxiliary winding W13 and the two terminals of the winding segment W1' are connected with the node G and the node F, respectively.

In an example, the turn number of the winding segment W1' is 1, and the auxiliary winding W13 is 2. The winding method may be referred to FIGS. 11 and 12. In FIG. 11, only the winding segment W1' of the first primary winding W1 and the second primary winding W2 are shown. The winding segment W1' of the first primary winding W1 is wound on the first winding leg 211. The second primary winding W2 is wound on the second winding leg 212. The winding segment W1' of the first primary winding W1 and the second primary winding W2 are electrically connected with each other. The auxiliary winding W13 is wound on the first lateral leg 213. The two terminals of the auxiliary winding W13 and the two terminals of the winding segment W1' are connected with the node G and the node F, respectively. Please refer to FIG. 12. In case that the winding segment W1' is wound on the first winding leg 211 in a clockwise direction, the auxiliary winding W13 is wound on the first lateral leg 213 in a counterclockwise direction. The auxiliary winding W13 and the winding segment W1' are electrically connected in parallel and connected between the node F and the node G. The winding width of the auxiliary winding w13 and the distribution of the AC magnetic flux in the magnetic core may similar to those of the above embodiments, and not redundantly described herein.

In some other embodiments, the auxiliary winding W13 may be electrically connected with any winding segment of the first primary winding W1 in parallel, or electrically connected with any winding segment of the second primary winding W2 in parallel. The auxiliary winding W13 may be wound on the second lateral leg 214 as long as the ratio between the turn number of the auxiliary winding W13 and the turn number of the winding segment of the first primary winding W1 is N:1. Consequently, a portion of the AC magnetic flux in the magnetic element is balanced, the size of the magnetic element is reduced, and the distribution of the magnetic flux in the magnetic element is controllable.

In the above embodiments, the auxiliary winding is electrically connected with a portion or the entire of the primary winding or a portion or the entire of the secondary winding in parallel, and the auxiliary winding is wound on one lateral leg. Consequently, the size of the magnetic element is reduced, and the distribution of the magnetic flux in the magnetic element is controllable. The technology of the present disclosure can be applied to other circuit topologies. For example, the primary side circuit is a half-bridge circuit, and the secondary side is a full-bridge rectifier circuit. In the following example, the secondary side is a full-bridge rectifier circuit.

Figure 14:
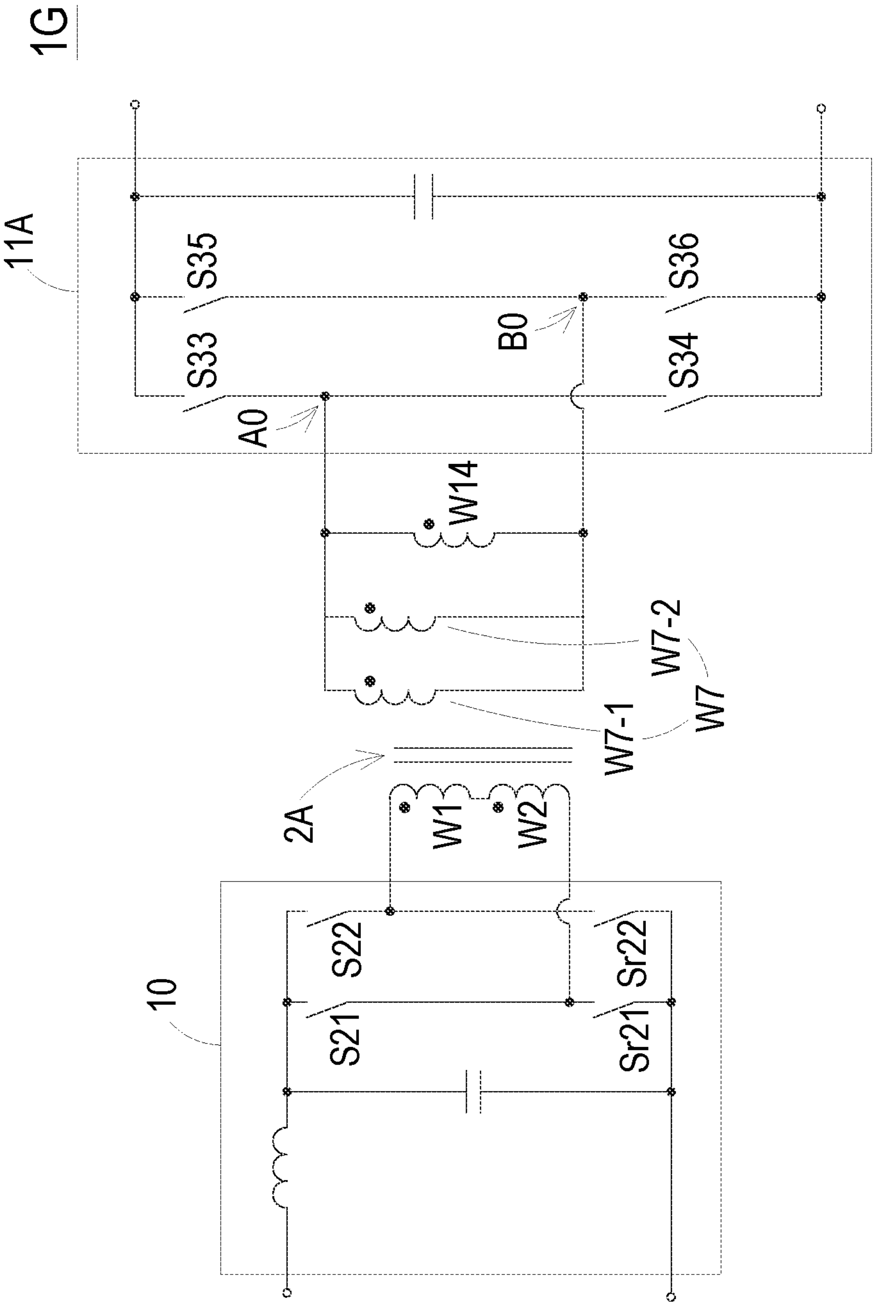
FIG. 14 is a schematic circuit diagram illustrating a power module according to a seventh embodiment of the present disclosure.
Figure 15:
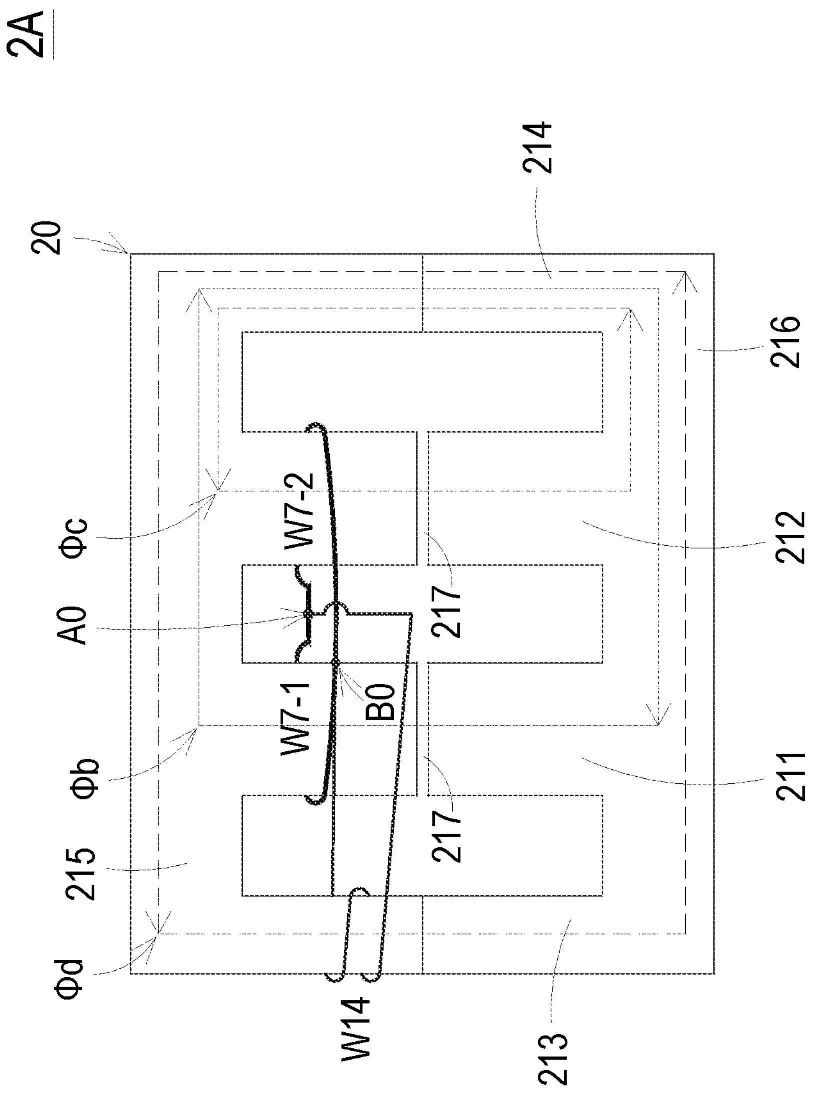
FIG. 15 is a schematic view illustrating the structure of a magnetic element of the power module as shown in FIG. 14.
Figure 16:
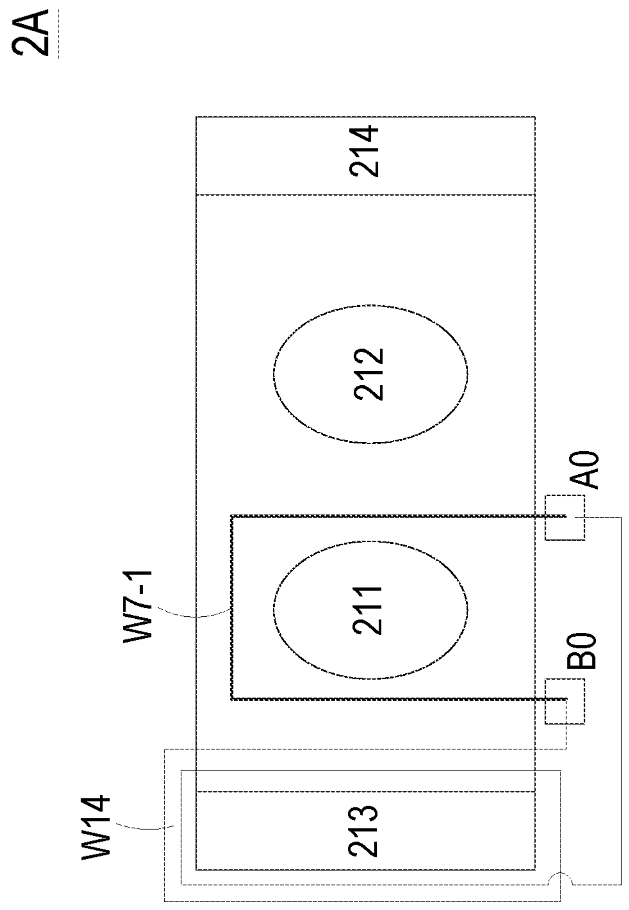
FIG. 16 schematically illustrates a winding method of the magnetic element as shown in FIG. 15.

Please refer to FIGS. 14, 15 and 16. FIG. 14 is a schematic circuit diagram illustrating a power module according to a seventh embodiment of the present disclosure. FIG. 15 is a schematic view illustrating the structure of a magnetic element of the power module as shown in FIG. 14. FIG. 16 schematically illustrates a winding method of the magnetic element as shown in FIG. 15. The secondary side circuit 11A of the power module 1G is a full-bridge rectifier circuit comprising four third switching units S33, S3, S35 and S36. The third switching unit S33 and the third switching unit S34 are connected with each other and collaboratively formed as a third bridge arm. The third switching unit S35 and the third switching unit S36 are connected with each other and collaboratively formed as a fourth bridge arm. In this embodiment, the magnetic element 2A of the power module 1G includes a first secondary winding W1, a second primary winding W2, a secondary winding W7 and an auxiliary winding W14. The secondary winding W7 is served as a parallel-connected winding set and electrically connected with the auxiliary winding W14 in parallel. Moreover, the ratio between the turn number of the auxiliary winding W14 and the turn number of the secondary winding W7 is N:1.

The winding method can be seen in FIGS. 15 and 16. The secondary winding W7 includes a plurality of sub-windings connected in parallel. The turn numbers of the sub-windings are identical. For example, the secondary winding W7 includes a first sub-winding W7-1 and a second sub-winding W7-2, which are electrically connected with each other in parallel. The first sub-winding W7-1 and the second sub-winding W7-2 are also electrically connected with the auxiliary winding W14 in parallel. Moreover, the ratio between the turn number of the auxiliary winding W14 and the turn number of the sub-winding W7-1 (W7-2) is N:1. For example, the turn number the sub-winding W7-1 (W7-2) is 1. The first sub-winding W7-1 is wound on the first winding leg 211. The second sub-winding W7-2 is wound on the second winding leg 212. The first sub-winding W7-1 and the second sub-winding W7-2 are connected between the midpoint A0 of the third bridge arm and the midpoint B0 of the fourth bridge arm. The winding direction of the first sub-winding W7-1 and the winding direction of the second sub-winding W7-2 are opposite. The auxiliary winding W14 is wound on the first lateral leg 213. The winding direction of the auxiliary winding W14 and the winding direction of the first sub-winding W7-1 are opposite. In FIG. 16, only first sub-winding W7-1 is shown. The first sub-winding W7-1 is wound on the first winding leg 211 in a clockwise direction, and the turn number is 1. The auxiliary winding W14 is wound on the first lateral leg 213 in a counterclockwise direction, and the turn number is 2.

In the above embodiments, the magnetic element includes two winding legs. In some embodiments, the magnetic element includes 2X winding legs, wherein X is a positive integer larger than 1. For example, the magnetic element includes four winding legs.

Figure 17:
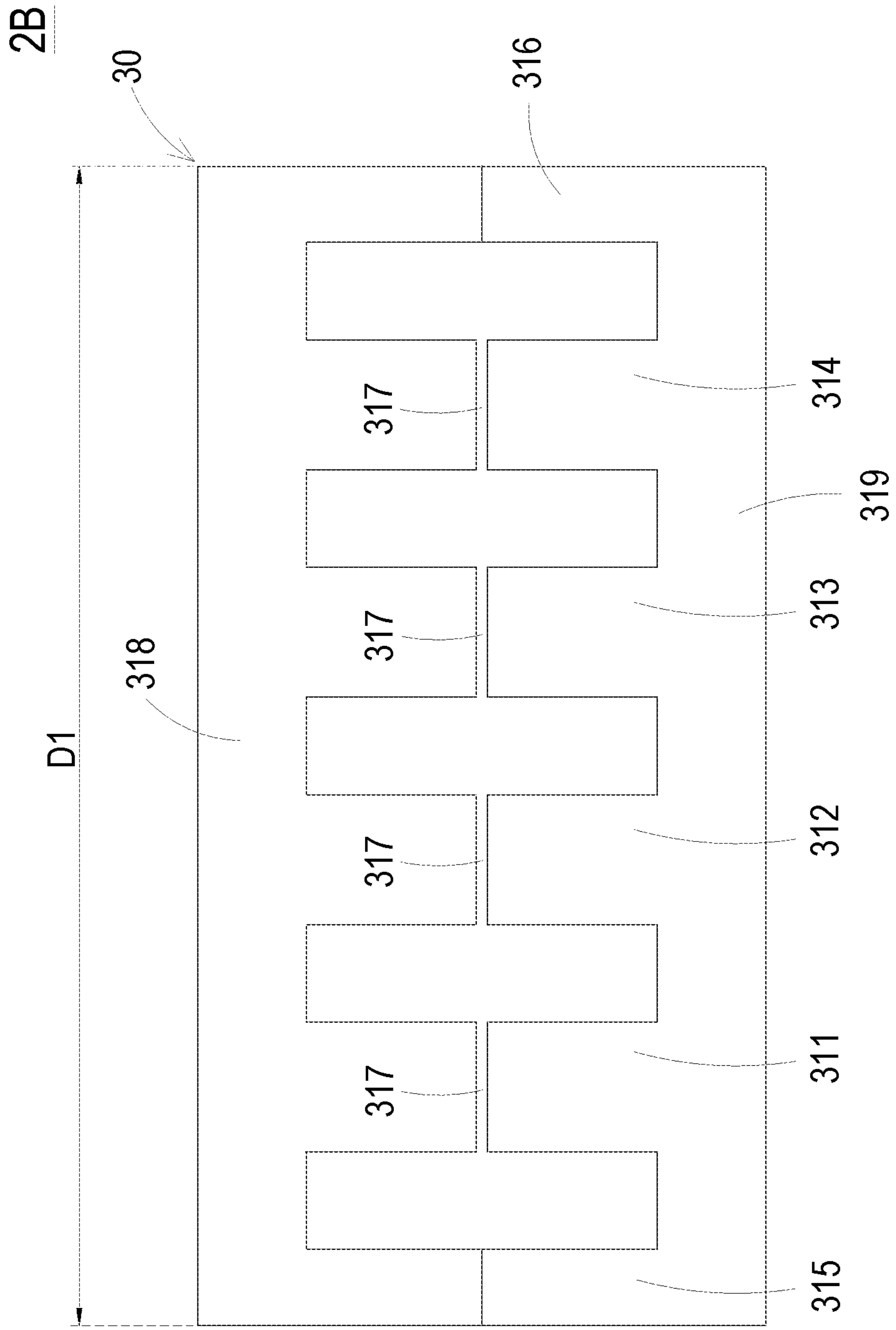
FIG. 17 is a schematic view illustrating the structure of another exemplary magnetic element.

FIG. 17 is a schematic view illustrating the structure of another exemplary magnetic element. The magnetic element 2B includes a magnetic core 30. The magnetic core 30 includes a first winding leg 311, a second winding leg 312, a third winding leg 313, a fourth winding leg 314, a first lateral leg 315, a second lateral leg 316, a first connection part 318 and a second connection part 319. The first lateral leg 315, the second lateral leg 316, the first connection part 318 and the second connection part 319 are similar to those of FIG. 1, and not redundantly described herein. Moreover, the first winding leg 311, the second winding leg 312, the third winding leg 313 and the fourth winding leg 314 are sequentially arranged along the linear direction D1. Moreover, each of the first winding leg 311, the second winding leg 312, the third winding leg 313 and the fourth winding leg 314 includes a first air gap 317.

Figure 18:
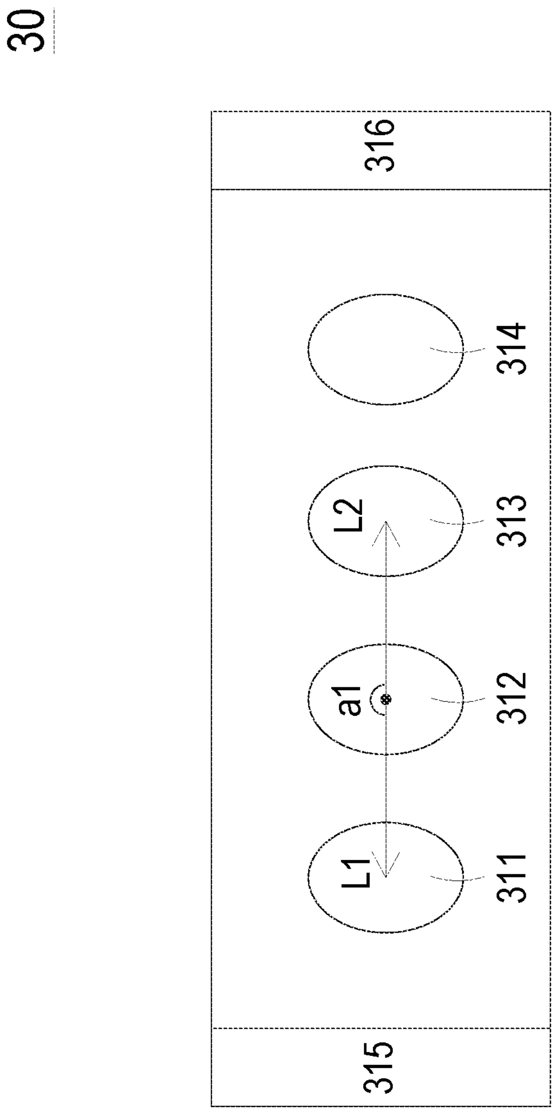
FIG. 18 is an example illustrating the relative locations of the winding legs of the magnetic core as shown in FIG. 17.
Figure 19:
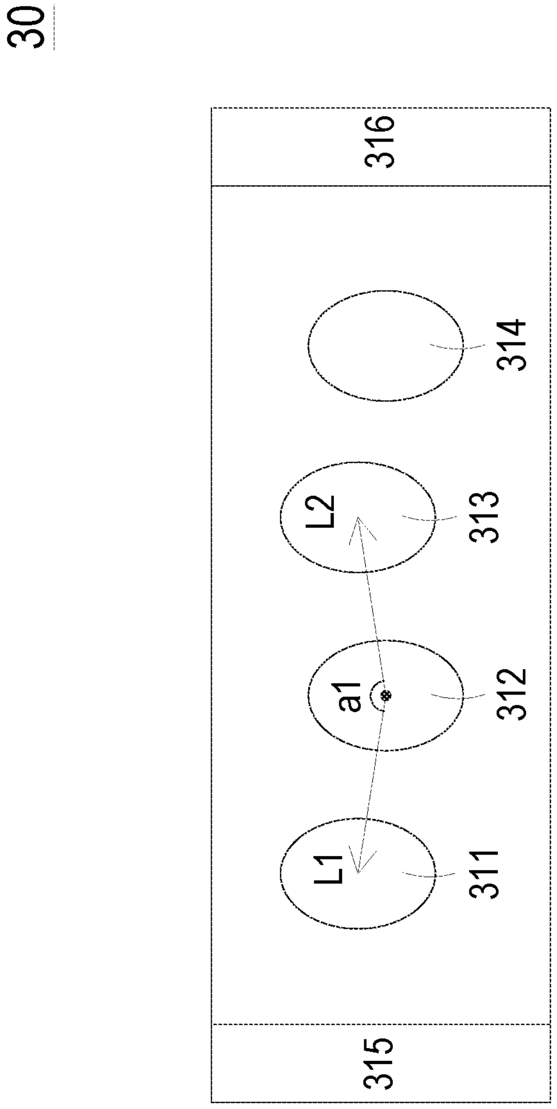
FIG. 19 is another example illustrating the relative locations of the winding legs of the magnetic core as shown in FIG. 17.

As mentioned above, the first winding leg 311, the second winding leg 312, the third winding leg 313 and the fourth winding leg 314 are sequentially arranged along the linear direction D1. However, the relative locations of these winding legs may be varied according to the practical requirements. FIG. 18 is an example illustrating the relative locations of the winding legs of the magnetic core as shown in FIG. 17. FIG. 19 is another example illustrating the relative locations of the winding legs of the magnetic core as shown in FIG. 17. In the example of FIG. 18, the first winding leg 311, the second winding leg 312, the third winding leg 313 and the fourth winding leg 314 of the magnetic core 30 are aligned with each other. In the example of FIG. 19, the first winding leg 311, the second winding leg 312, the third winding leg 313 and the fourth winding leg 314 of the magnetic core 30 are staggered. A first line L1 passes through the second winding leg 312 and the first winding leg 311. A second line L2 passes through the second winding leg 312 and the third winding leg 313. An angle a1 between the first line L1 and the second line L2 is larger than 90 degrees.

Figure 20:
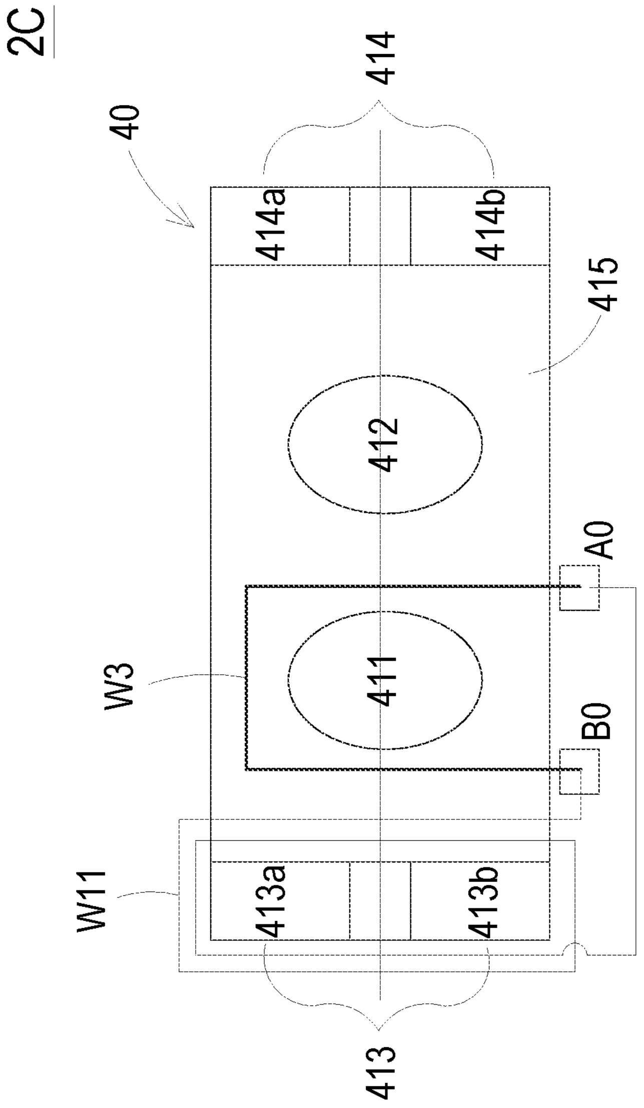
FIG. 20 is a schematic view illustrating the structure of another exemplary magnetic element.

In the above embodiments, each of the first lateral leg and the second lateral leg may have a single leg structure. In some embodiments, at least one of the first lateral leg and the second lateral leg is divided into a plurality of sub-leg structures, which are separated from each other. FIG. 20 is a schematic view illustrating the structure of another exemplary magnetic element. The magnetic element 2C includes a magnetic core 40. The magnetic core 40 includes a first lateral leg 413, a second lateral leg 414, a first winding leg 411 and a second winding leg 412. The first lateral leg 413 includes two separate sub-leg structures 413*a* and 413*b*. The second lateral leg 414 includes two separate sub-leg structures 414*a* and 414*b*. The winding methods of the first secondary winding W3 and the auxiliary winding W11 (see FIG. 2) will be described. The auxiliary winding W11 is wound around the sub-leg structures 413*a* and 413*b*. The direction of the magnetic flux flowing through the sub-leg structure 413*a* is identical to the direction of the magnetic flux flowing through the sub-leg structure 413*b*. The direction of the magnetic flux flowing through the sub-leg structure 414*a* is identical to the direction of the magnetic flux flowing through the sub-leg structure 414*b*. The direction of the magnetic flux flowing through the sub-leg structure 413*a* (or 413*b*) is opposite to the direction of the magnetic flux flowing through the sub-leg structure 414*a* (or 414*b*). The number of the sub-leg structures in the lateral leg of the magnetic element is not restricted as long as the auxiliary winding is wound around a portion of the sub-leg structures. Consequently, the direction of the magnetic flux flowing through some sub-leg structures is opposite to the direction of the magnetic flux flowing through the other sub-leg structures.

In order to realize the control of the magnetic flux of a specific magnetic leg in the magnetic core and the distribution of the magnetic flux of an excitation winding, the following method can be adopted.

The magnetic element includes the magnetic core, the excitation winding and an auxiliary winding. The magnetic core includes x first magnetic legs, a second magnetic leg and a third magnetic leg. Each of the x first magnetic legs is wound with an excitation winding. The auxiliary winding is partially or completely wound on the second magnetic leg, wherein x≥1. The arrangement of the x first magnetic legs, the second magnetic leg and the third magnetic leg in the magnetic core is not limited, but a magnetic path can be formed in the x first magnetic legs, the second magnetic leg and the third magnetic leg. There is an excitation current passing through the excitation winding so that a magnetic flux is generated in the magnetic core, wherein each of the x first magnetic legs corresponds to a magnetic flux φ1*x* passed through, and a vector sum of all magnetic flux φ1*x* is a first magnetic flux φ1. A second magnetic flux φ2 is passing through the second magnetic leg, and a third magnetic flux φ3 is passing through the third magnetic leg. It should be noted that the number of the third magnetic leg is not limited, each magnetic leg without any winding wound on can be seen as a third magnetic leg. If the number of the third magnetic legs is greater than 1, a vector sum of all magnetic flux passing through these third magnetic legs is the third magnetic flux φ3. The auxiliary winding can clamp the second magnetic flux φ2 so as to achieve the purpose of controlling the magnetic flux.

For the convenience of description, one of the possible magnetic cores is exemplified as below. The second magnetic leg, the x first magnetic legs and the third magnetic leg of the magnetic core are arranged in sequence. The x first magnetic legs are arranged between the second magnetic leg and the third magnetic leg, and each of the x first magnetic legs is wound with the excitation winding. The magnetic core includes the first connection part and the second connection part. The x first magnetic legs, the second magnetic leg and the third magnetic leg are arranged between the first connection part and the second connection part.

The auxiliary winding can be connected with an electromotive force V0. According to the Faraday's law of electromagnetic induction, V0=N*dφ/dt, wherein N is the turns of the auxiliary winding wound on the second magnetic leg. The magnetic flux φ0 generated by the auxiliary winding and passing through the second magnetic leg is equal to V0/N. Furthermore, the magnetic flux passing through the second magnetic leg is clamped to φ0, and the second magnetic flux φ2 passing through the second magnetic leg must be equal to φ0. Hence, the second magnetic flux φ2 is clamped to φ0 so as to achieve the purpose of controlling the magnetic flux. In some embodiments, the auxiliary winding can be connected in parallel with the excitation winding to obtain an electromotive force V1 equal to that of the excitation winding. Take one of the x first magnetic legs as a reference magnetic leg, wherein the 1-turn excitation winding is wound on the reference magnetic leg, the reference magnetic flux φ1*r* is equal to V1/1 at this time, and the magnetic flux generated by the auxiliary winding on the second magnetic leg is φ0=V1/N, where N is the number of turns of the auxiliary winding wound on the second magnetic leg. The second magnetic flux φ2 must be equal to φ0. It is therefore that the ratio of φ2 and Or is equal to 1:N. In other embodiments, the number of turns of the excitation winding on the reference magnetic leg can be M, and then the ratio of φ2 and φ1*r* is equal to M:N, wherein N is greater than M. It can realize the control of the second magnetic flux φ2.

Figure 21:
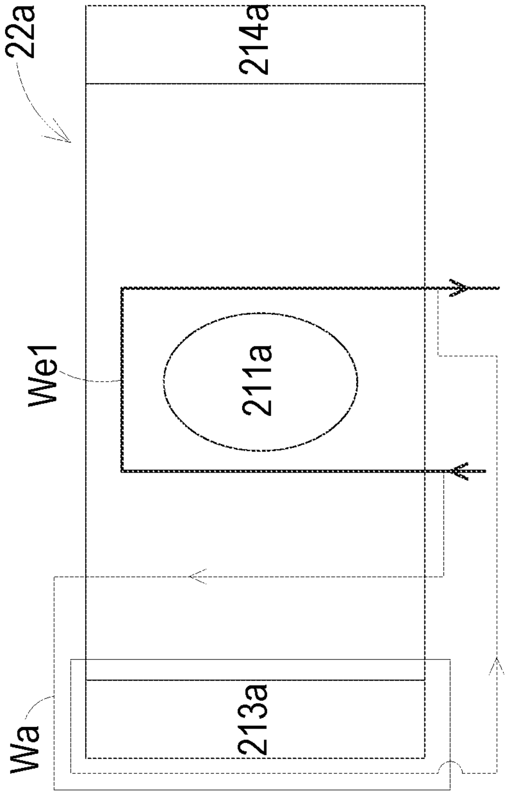
FIG. 21 is a schematic view illustrating the structure of another exemplary magnetic element.

Please refer to FIG. 21. FIG. 21 is a schematic view illustrating the structure of another exemplary magnetic element. The magnetic core 22*a* includes one first magnetic leg 211*a*, a second magnetic leg 213*a* and a third magnetic leg 214*a*. The second magnetic leg 213*a*, the first magnetic leg 211*a* and the third magnetic leg 214*a* are arranged in a straight line, and the first magnetic leg 211*a* is arranged in the middle of the second magnetic leg 213*a* and the third magnetic leg 214*a*. The excitation winding We1 is wound on the first magnetic leg 211*a*, and the number of turns of the excitation winding is 1, wherein a magnetic flux φ11 is passing through the first magnetic leg 211*a*. The auxiliary winding Wa is connected with the excitation winding We1 in parallel, the auxiliary winding Wa is wound on the second magnetic leg 213*a*, and the number of turns of the auxiliary winding We1 is 2. The winding direction of the auxiliary winding and the winding direction of the excitation winding can be the same or the opposite. When the winding direction of the auxiliary winding Wa is opposite to that of the excitation winding We1, according to the description of the above principle, since the ratio of the number of turns of the auxiliary winding Wa to the number of turns of the excitation winding We1 is 2:1, the second magnetic flux φ2 passing through the second magnetic leg 213*a* is equal to 0.5*φ11, and the direction of the second magnetic flux φ2 is opposite to that of the magnetic flux φ11. Since the number of the first magnetic leg is one in this embodiment, the first magnetic flux φ1 is equal to the magnetic flux φ11. And a vector sum of the first magnetic flux φ1, the second magnetic flux φ2 and the third magnetic flux φ3 is zero. Hence, the third magnetic flux φ3=φ1−φ2=φ11−φ2=0.5φ11. When the winding direction of the auxiliary winding Wa is same to that of the excitation winding We1, the second magnetic flux φ2 passing through the second magnetic leg 213*a* is also equal to 0.5*φ11, but the direction of the second magnetic flux φ2 changes to be the same as the direction of the magnetic flux φ11, in that case the third magnetic flux φ3=φ1+φ2=φ11+φ2=1.5 φ11. The auxiliary winding Wa can clamp the second magnetic flux φ2 so as to achieve the purpose of controlling the second magnetic flux φ2. By controlling the turns ratio of the auxiliary winding to the excitation winding, the magnitude of the second magnetic flux φ2 can be controlled. And when a vector sum of the first magnetic flux φ1, the second magnetic flux φ2 and the third magnetic flux φ3 is zero, by controlling the direction of the auxiliary winding, the magnitude of the third magnetic flux φ3 can be controlled indirectly.

Figure 22A:
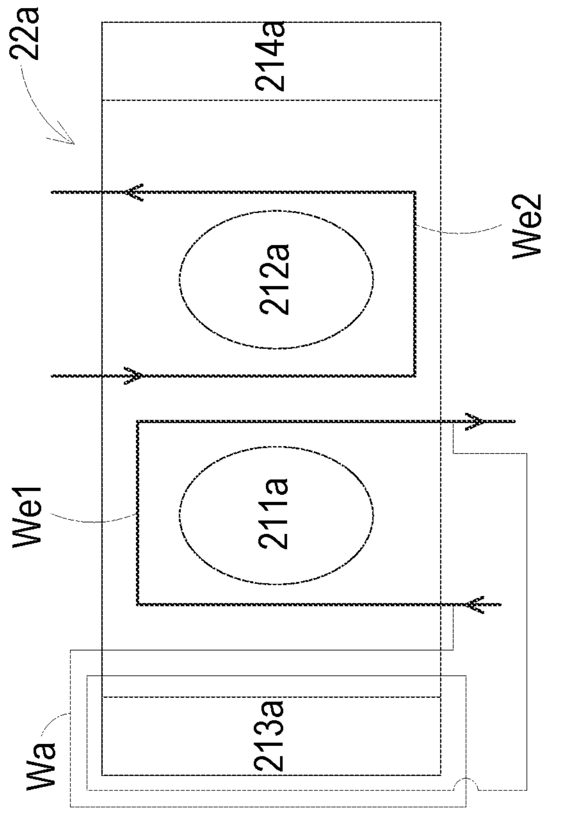
FIGS. 22A to 22C are schematic views illustrating the structure of several different exemplary magnetic elements.
Figure 22B:
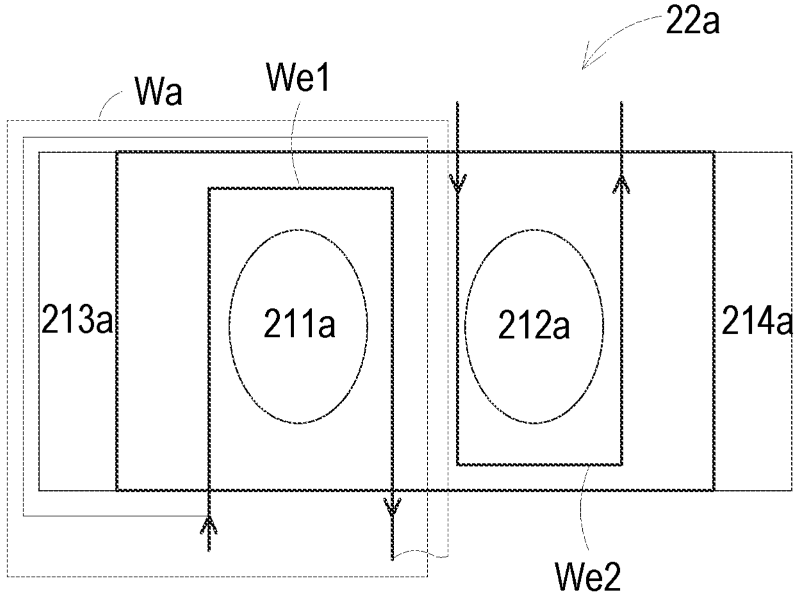
Figure 22C:
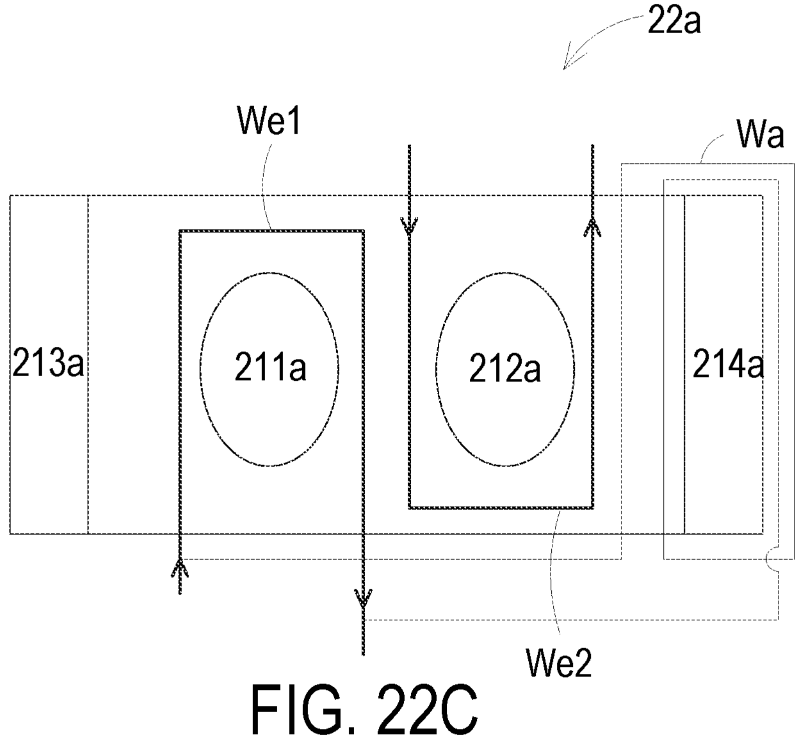

Please refer to FIGS. 22A to 22C. FIGS. 22A to 22C are schematic views illustrating the structure of several different exemplary magnetic elements. As shown in FIGS. 22A to 22C, the magnetic core 22*a* may include two first magnetic legs, 211*a* and 212*a*. An excitation winding We1 is wound on the first magnetic leg 211*a*, an excitation winding We2 is wound on the first magnetic leg 212*a*. The winding direction of the excitation winding We1 and the winding direction of the excitation winding We2 can be the same or the opposite. The magnetic flux passing through the first magnetic leg 211*a* is φ11, and the magnetic flux passing through the first magnetic leg 212*a* is φ12. A vector sum of the magnetic flux φ11 and the magnetic flux φ12 is the first magnetic flux φ1. The magnetic flux relationship satisfies that the vector sum of the first magnetic flux φ1, the second magnetic flux φ2 and the third magnetic flux φ3 is zero. The embodiments shown in FIGS. 22A—and 22C are similar to the embodiment shown in FIG. 21. The auxiliary winding Wa is connected with the excitation winding We1 in parallel. Since the ratio of the number of turns of the auxiliary winding Wa to the number of turns of the excitation winding We1 is 2:1, the second magnetic flux φ2 passing through the second magnetic leg 213*a* is equal to 0.5*φ11. In some embodiments shown in FIG. 22C, the auxiliary winding Wa can also be wound on the third magnetic leg 214*a*. In that case the third magnetic flux φ3 is clamped by the auxiliary winding Wa. The principle is the same as the embodiment shown in FIG. 22A. Please refer to FIG. 22B, in this embodiment, the number of turns of the auxiliary winding Wa is 2, and the auxiliary winding Wa is connected with the excitation winding We1 in parallel. Although the auxiliary winding Wa is wound on the first magnetic leg 211*a* and the second magnetic leg 213*a*, but the number of turns of the auxiliary winding Wa wound on the second magnetic leg 213*a* is still 2 so that the ratio of the number of turns of the auxiliary winding Wa wound on the second magnetic leg 213*a* to the number of turns of the excitation winding We1 is still 2:1. It is therefore that the second magnetic flux φ2 passing through the second magnetic leg 213*a* is equal to 0.5*φ11. Based on the above analysis, the auxiliary wingding can also be wound on the second magnetic leg and all the first magnetic legs, as long as the second magnetic leg is wound with auxiliary winding, the second magnetic flux φ2 can be clamped.

Figure 23A:
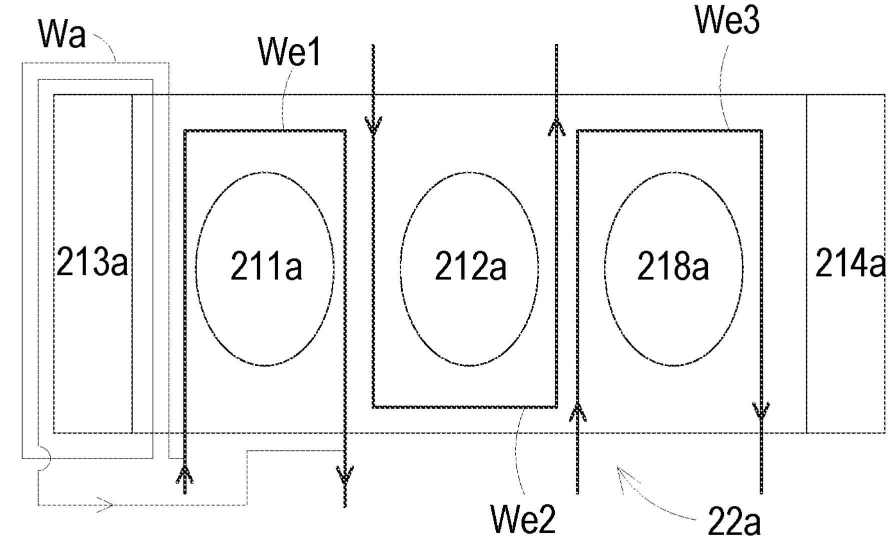
FIGS. 23A to 23D are schematic views illustrating the structure of several different exemplary magnetic elements.
Figure 23B:
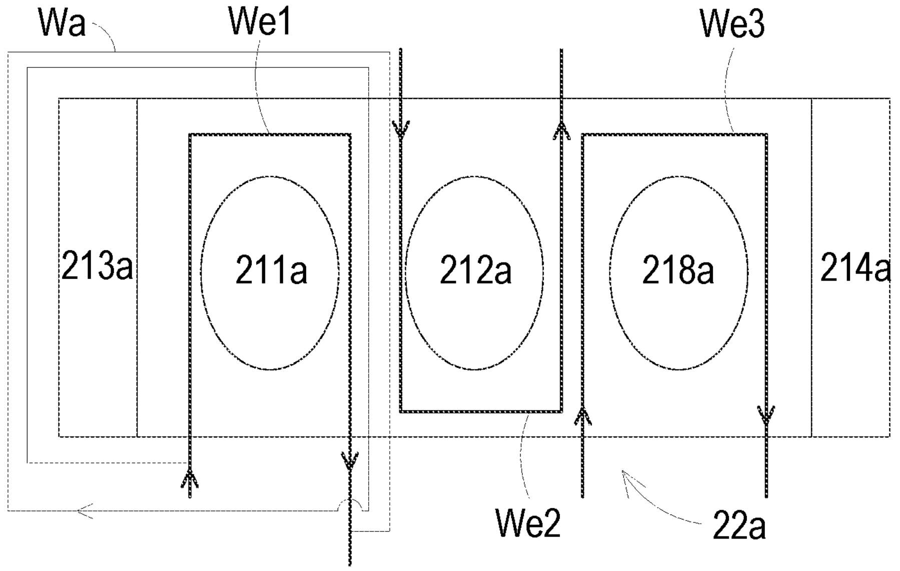
Figure 23C:
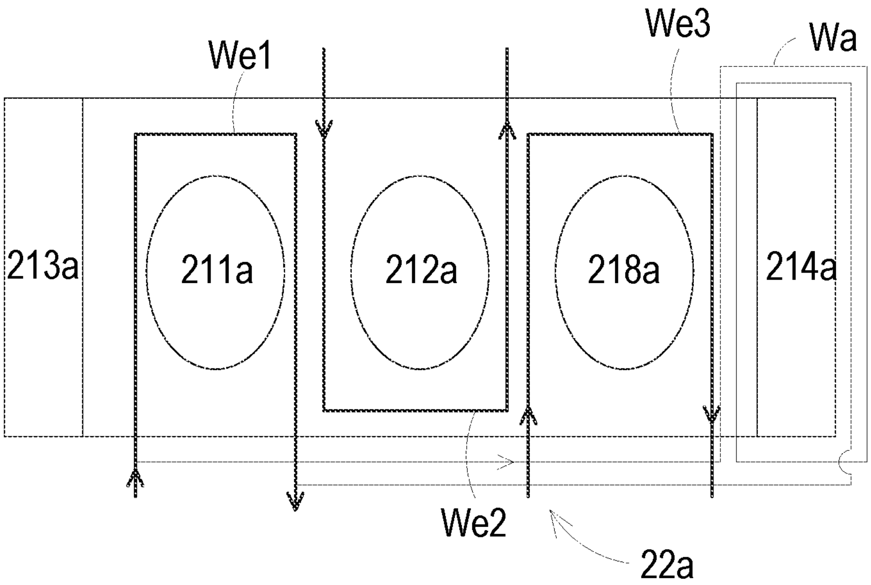
Figure 23D:
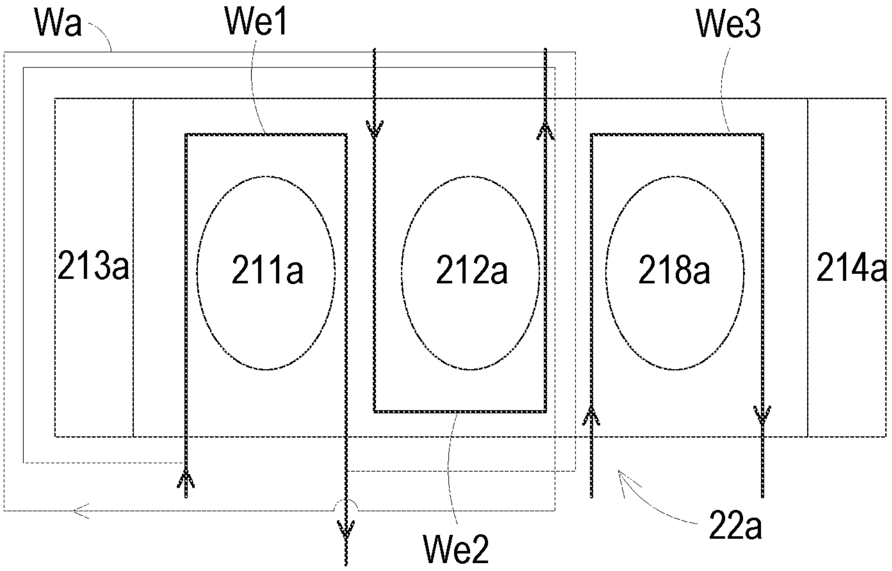

Please refer to FIGS. 23A to 23D. FIGS. 23A to 23D are schematic views illustrating the structure of several different exemplary magnetic elements. As shown in FIGS. 23A to 23D, the magnetic core 22*a* may include three first magnetic legs, 211*a*, 212*a* and 218*a*. An excitation winding We1 is wound on the first magnetic leg 211*a*, an excitation winding We2 is wound on the first magnetic leg 212*a*, and an excitation winding We3 is wound on the first magnetic leg 218*a*. The winding direction of each of the excitation winding We1, We2 and We3 is not limited. The magnetic flux passing through the first magnetic leg 211*a* is φ11, the magnetic flux passing through the first magnetic leg 212*a* is φ12, and the magnetic flux passing through the first magnetic leg 218*a* is φ13. A vector sum of the magnetic flux φ11, the magnetic flux φ12 and the magnetic flux φ13 is the first magnetic flux φ1. The magnetic flux relationship satisfies that the vector sum of the first magnetic flux φ1, the second magnetic flux φ2 and the third magnetic flux φ3 is zero. The embodiments shown in FIGS. 23A and 23C are similar to the embodiment shown in FIG. 21. The auxiliary winding Wa is connected with the excitation winding We1 in parallel. Since the ratio of the number of turns of the auxiliary winding Wa to the number of turns of the excitation winding We1 is 2:1, the second magnetic flux φ2 passing through the second magnetic leg 213*a* is equal to 0.5*φ11. Please refer to FIG. 23B. The embodiment shown in FIG. 23B is similar to the embodiment shown in FIG. 22B, and the number of turns of the auxiliary winding Wa is 2. The auxiliary winding Wa is connected with the excitation winding We1 in parallel. Although the auxiliary winding Wa is wound on the first magnetic leg 211*a* and the second magnetic leg 213*a*, but the number of turns of the auxiliary winding Wa wound on the second magnetic leg 213*a* is still 2, so the ratio of the number of turns of the auxiliary winding Wa wound on the second magnetic leg 213*a* to the number of turns of the excitation winding We1 is still 2:1. The second magnetic flux φ2 passing through the second magnetic leg 213*a* is equal to 0.5*φ11. Please refer to FIG. 23D. The embodiment shown in FIG. 23D is similar to the embodiment shown in FIG. 23C, and the number of turns of the auxiliary winding Wa is 2. The auxiliary winding Wa is connected with the excitation winding We1 in parallel. Although the auxiliary winding Wa is wound on the second magnetic leg 213*a*, the first magnetic leg 211*a* and the first magnetic leg 212*a*, but the number of turns of the auxiliary winding Wa wound on the second magnetic leg 213*a* is still 2, so that the ratio of the number of turns of the auxiliary winding Wa wound on the second magnetic leg 213*a* to the number of turns of the excitation winding We1 is still 2:1. The second magnetic flux φ2 passing through the second magnetic leg 213*a* is equal to 0.5*φ11.

Figure 24A:
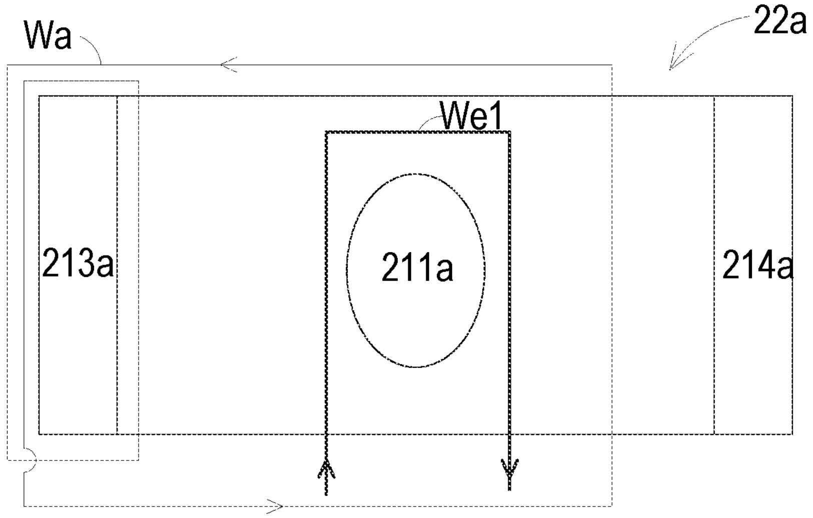
FIG. 24A is a schematic view illustrating the structure of another exemplary magnetic element.

In some embodiments, the auxiliary winding can also be disconnected from the electromotive force, and the auxiliary winding can be a closed end-to-end coil and is wound on the second magnetic leg and at least one of the x first magnetic legs. Please refer to FIG. 24A. FIG. 24A is a schematic view illustrating the structure of another exemplary magnetic element. In this embodiment, the auxiliary winding Wa is a closed end-to-end coil and wound on the first magnetic leg 211*a* and the second magnetic leg 213*a*, wherein the number of turns of the auxiliary winding Wa wound on the second magnetic leg 213*a* is 2, and the number of turns of the auxiliary winding Wa wound on the first magnetic leg 211*a* is 1. The excitation winding We1 is wound on the first magnetic leg 211*a*, and the number of turns of the excitation winding We1 is 1 turn. The magnetic flux passing through the first magnetic leg 211*a* is φ11. The electromotive force E1 induced on the auxiliary winding Wa by the magnetic flux φ11 is equal to 1*φ11, and the induced current is counterclockwise. The electromotive force E2 induced on the auxiliary winding Wa by the second magnetic flux φ2 passing through the second magnetic leg 213*a* is equal to 2*φ2, and the induced current is clockwise. The direction of the electromotive force E1 and that of the electromotive force E2 are opposite. In case that the electromotive force E1 is greater than the electromotive force E2, and a counterclockwise induced current will be generated in the auxiliary winding Wa, and the induced current will generate a magnetic flux opposite to the first magnetic flux φ11 on the first magnetic leg 211*a*, so that the electromotive force E1 decreases. The induced current will generate a magnetic flux in the same direction as the second magnetic flux φ2 on the second magnetic leg 213*a*, so that the electromotive force E2 increases. Finally, the electromotive force E1 is equal to the electromotive force E2. When the stabilization is reached, no induced current flows in the auxiliary winding Wa. The analysis of the case that the electromotive force E1 less than the electromotive force E2 is similar and is not repeatedly described hereafter. Since the current in the auxiliary winding Wa is constantly changing, the induced current in the auxiliary winding Wa fluctuates around zero to maintain a dynamic balance. When the electromotive force E1 is equal to the electromotive force E2, 1*φ11 is equal to 2*φ2, so that φ2 is equal to 0.5*φ11. It is therefore that the auxiliary winding Wa can also realize the control of the second magnetic flux φ2. In addition, in case that the auxiliary winding Wa is wound on the second magnetic leg 213*a* for N turns and wound on the first magnetic leg 211*a* for M turns, the ratio of the second magnetic flux φ2 to the magnetic flux φ11 is M:N, wherein N is greater than M.

Figure 24B:
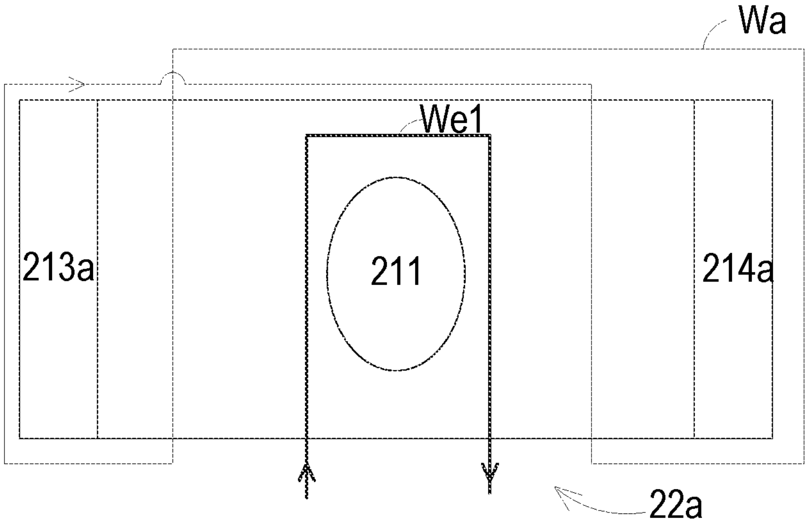
FIG. 24B is a schematic view illustrating the structure of another exemplary magnetic element.

When the auxiliary winding Wa is a closed end-to-end coil, and the auxiliary winding Wa is wound on the second magnetic leg and the third magnetic leg in opposite directions, the effect of controlling the second magnetic flux φ2 can also be achieved. Please refer to FIG. 24B. FIG. 24B is a schematic view illustrating the structure of another exemplary magnetic element. In this embodiment, the auxiliary winding Wa is wound on the second magnetic leg 213*a* and the third magnetic leg 214*a* in an 8 shape so as to realize the opposite winding direction on the second magnetic leg 213*a* and the third magnetic leg 214*a*, wherein the number of turns of the auxiliary winding Wa wound on the second magnetic leg 213*a* is 1, and the number of turns of the auxiliary winding Wa wound on the third magnetic leg 214*a* is 1. The electromotive force E2 induced on the auxiliary winding Wa by the second magnetic flux φ2 passing through the second magnetic leg 213*a* is equal to 1*φ2, and the induced current is clockwise. The electromotive force E3 induced on the auxiliary winding Wa by the third magnetic flux φ3 passing through the third magnetic leg 214*a* is equal to 1*φ0, and the induced current is clockwise. The direction of the electromotive force E2 and that of the electromotive force E3 are opposite. In case that the electromotive force E2 is greater than the electromotive force E3, a clockwise induced current will be generated in the auxiliary winding Wa wound on the second magnetic leg 213*a*, and the induced current will generate a magnetic flux opposite to the second magnetic flux φ2 on the second magnetic leg 213*a* so that the electromotive force E2 decreases. A counterclockwise induced current will be generated in the auxiliary winding Wa wound on the third magnetic leg 214*a*, and the induced current will generate a magnetic flux in the same direction as the third magnetic flux φ3 on the third magnetic leg 214*a* so that the electromotive force E3 increases. Finally, the electromotive force E2 is equal to the electromotive force E3. When the stabilization is reached, no induced current flows in the auxiliary winding Wa. The analysis of the case that the electromotive force E2 less than the electromotive force E3 is similar and is not repeatedly described hereafter. Since the current in the auxiliary winding Wa is constantly changing, the induced current in the auxiliary winding Wa fluctuates around zero to maintain a dynamic balance. When the electromotive force E2 is equal to the electromotive force E3, 1*φ2 is equal to 1*φ3. Therefore, φ2 is equal to φ3. Since φ1 is equal to the sum of φ2 and φ3, φ2=φ3=0.5*φ1. It is therefore that the auxiliary winding Wa can also realize the control of the second magnetic flux φ2. In addition, in case that the auxiliary winding Wa is wound on the second magnetic leg 213*a* for P turns and wound on the third magnetic leg 214*a* for Q turns, the ratio of the second magnetic flux φ2 to the third magnetic flux φ3 is Q:P.

Figure 25:
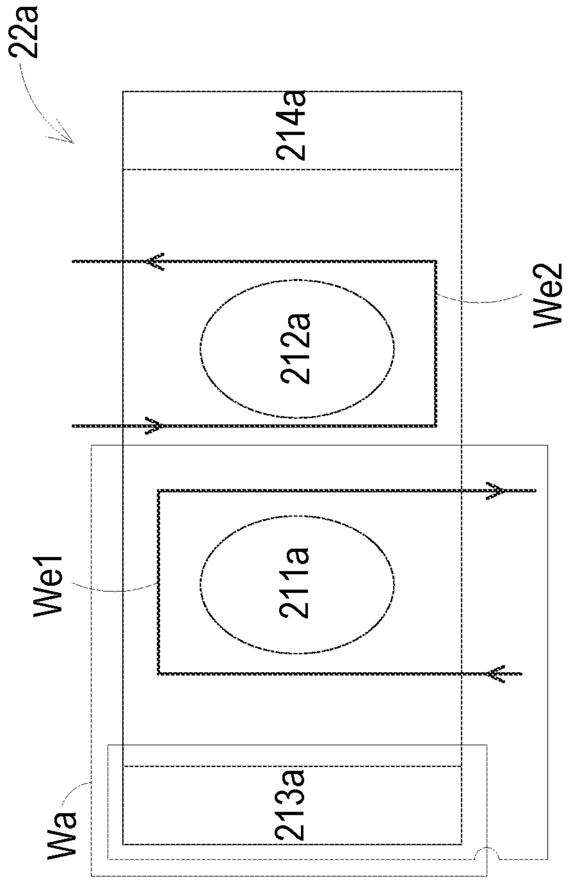
FIG. 25 is a schematic view illustrating the structure of another exemplary magnetic element.

Please refer to FIG. 25. FIG. 25 is a schematic view illustrating the structure of another exemplary magnetic element. In this embodiment, the magnetic core 22*a* may include two first magnetic legs, 211*a* and 212*a*. The winding methods of the auxiliary winding Wa and the excitation winding We1 are similar to those of the embodiment shown in FIG. 24A, and the principle of controlling the second magnetic flux φ2 by the auxiliary winding Wa is not repeatedly described hereafter.

Figure 26A:
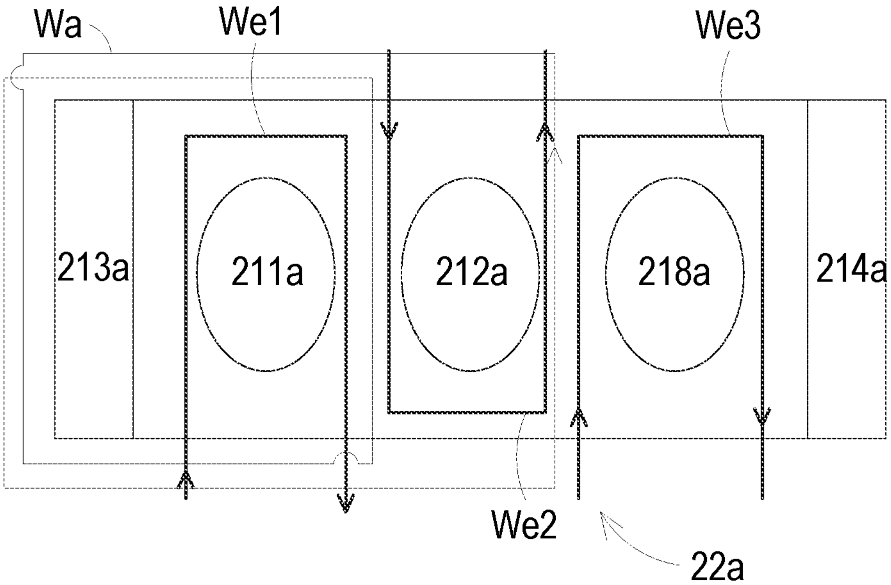
FIG. 26A is a schematic view illustrating the structure of another exemplary magnetic element.

Please refer to FIG. 26A. FIG. 26A is a schematic view illustrating the structure of another exemplary magnetic element. In this embodiment, the magnetic core 22*a* may include three first magnetic legs, 211*a*, 212*a* and 218*a*. An excitation winding We1 is wound on the first magnetic leg 211*a*, an excitation winding We2 is wound on the first magnetic leg 212*a*, and an excitation winding We3 is wound on the first magnetic leg 218*a*. The winding direction of each of the excitation winding We1, We2 and We3 is not limited. The magnetic flux passing through the first magnetic leg 211*a* is φ11, the magnetic flux passing through the first magnetic leg 212*a* is φ12, and the magnetic flux passing through the first magnetic leg 218*a* is φ13. The auxiliary winding Wa is wound on the second magnetic leg 213*a* for 2 turns, the auxiliary winding Wa is wound on the first magnetic leg 211*a* for 2 turns, and the auxiliary winding Wa is wound on the first magnetic leg 212*a* for 1 turn. When the magnitude of the magnetic flux φ11 is equal to the magnitude of the magnetic flux φ12, and the direction of the magnetic flux φ11 is opposite to the magnitude of the magnetic flux φ12, the electromotive force generated by the magnetic flux φ12 and the electromotive force generated by the magnetic flux φ11 in the auxiliary winding Wa can be partially offset. The auxiliary winding Wa is actually equivalent to be wound on the second magnetic leg 213*a* for 2 turns, and wound on the first magnetic leg 211*a* for 1 turn. In this embodiment, it can be analyzed with reference to the embodiment shown in FIG. 24A.

Figure 26B:
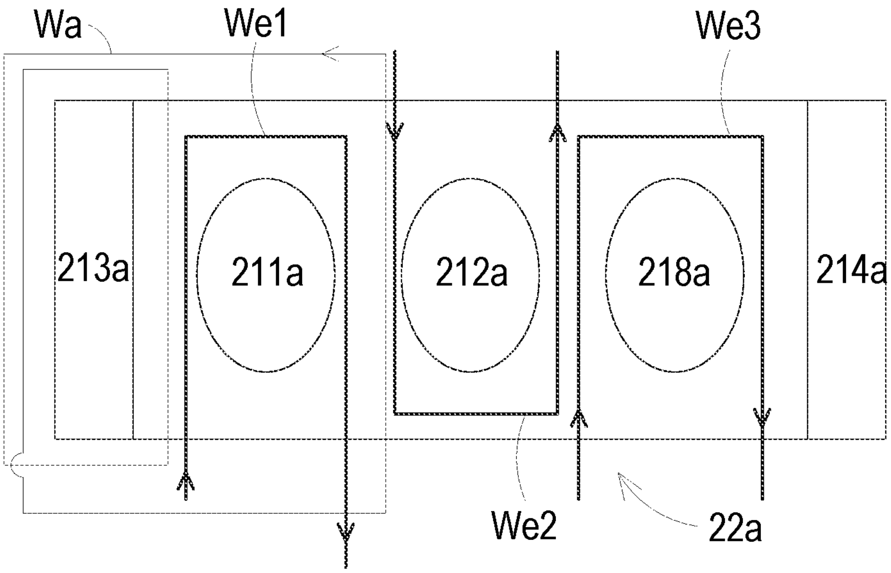
FIG. 26B is a schematic view illustrating the structure of another exemplary magnetic element.

Please refer to FIG. 26B. FIG. 26B is a schematic view illustrating the structure of another exemplary magnetic element. In this embodiment, the magnetic core 22*a* may include three magnetic legs as the same shown in FIG. 26A. Since the number of turns of the auxiliary winding Wa wound on the second magnetic leg 213*a* is 2 turns, and the number of turns of the auxiliary winding Wa wound on the first magnetic leg 211*a* is 1 turn, it can be directly analyzed with reference to the embodiment shown in FIG. 24A.

Figure 26C:
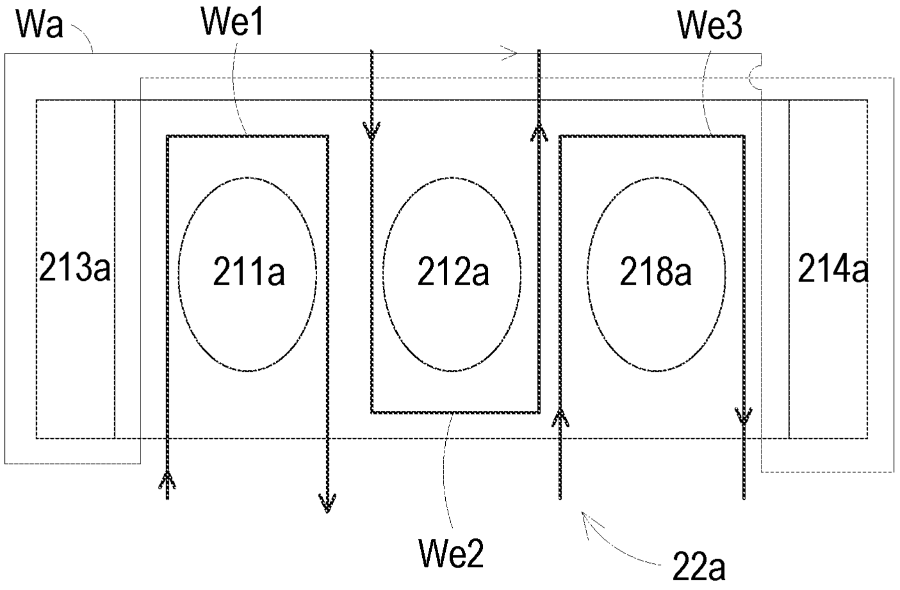
FIG. 26C is a schematic view illustrating the structure of another exemplary magnetic element.

Please refer to FIG. 26C. FIG. 26C is a schematic view illustrating the structure of another exemplary magnetic element. In this embodiment, the magnetic core 22*a* may include three first magnetic legs as the same shown in FIG. 26A. Since the number of turns of the auxiliary winding Wa wound on the second magnetic leg 213*a* is 1 turn, and the number of turns of the auxiliary winding Wa wound on the third magnetic leg 214*a* is 1 turn, it can be directly analyzed with reference to the embodiment shown in FIG. 24B.

Figure 26D:
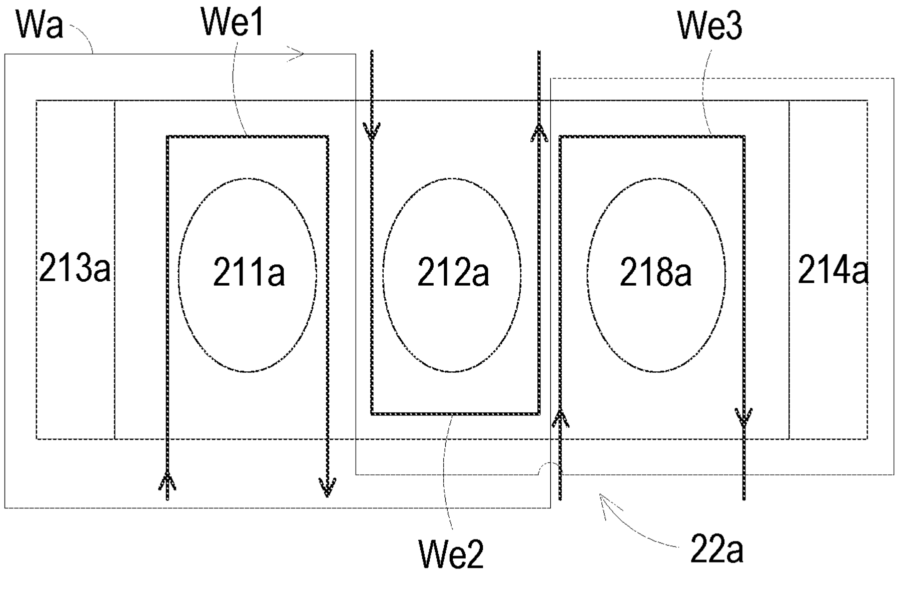
FIG. 26D is a schematic view illustrating the structure of another exemplary magnetic element.

Please refer to FIG. 26D. FIG. 26D is a schematic view illustrating the structure of another exemplary magnetic element. In this embodiment, the magnetic core 22*a* may include three first magnetic legs as the same shown in FIG. 26A. An excitation winding We1 is wound on the first magnetic leg 211*a*, an excitation winding We2 is wound on the first magnetic leg 212*a*, and an excitation winding We3 is wound on the first magnetic leg 218*a*. The winding direction of each of the excitation winding We1, We2 and We3 is not limited. The magnetic flux passing through the first magnetic leg 211*a* is φ11, the magnetic flux passing through the first magnetic leg 212*a* is φ12, and the magnetic flux passing through the first magnetic leg 218*a* is φ13. The auxiliary winding Wa is wound on the second magnetic leg 213*a* and the first magnetic leg 211*a* for 1 turn in the same direction, and then is wound on the first magnetic leg 218*a* and the third magnetic leg 214*a* for 1 turn in the opposite direction. When the magnitude of the magnetic flux φ11 is equal to the magnitude of the magnetic flux φ13, and the direction of the magnetic flux φ11 is opposite to the magnitude of the magnetic flux φ13, the electromotive force generated by the fifth magnetic flux φ13 and the electromotive force generated by the first magnetic flux φ11 in the auxiliary winding Wa can be partially offset. The auxiliary winding is actually equivalent to be wound on the second magnetic leg 213*a* for 1 turn, and wound on the third magnetic leg 214*a* for 1 turn. In this embodiment, it can be analyzed with reference to the embodiment shown in FIG. 24B.

In all the embodiments shown in FIGS. 24A to 26D above, the second magnetic leg 213*a* can be equivalent to the first lateral leg mentioned above, the third magnetic leg 214*a* can be equivalent to the second lateral leg mentioned above. The x first magnetic legs can be equivalent to the winding legs such as the first winding leg and the second winding leg. The excitation winding can be the first secondary winding or any other secondary winding mentioned above. The excitation winding can also be the first primary winding mentioned above or any other primary winding. The excitation windings wound on different first magnetic legs can connected with each other in parallel or in series. The present application discloses two ways of controlling the second magnetic flux φ2 using auxiliary windings. When the auxiliary winding is a closed end-to-end coil, the power consumption is almost zero, which can save energy. When the auxiliary winding is connected to an electromotive force, there will be a current flowing through the auxiliary wingding, which may cause the power consumption.

From the above descriptions, the present disclosure provides a magnetic element. An auxiliary winding is wound on a lateral leg. According to the ratio between the turn number of the auxiliary winding and the turn number of the parallel-connected winding set, the AC magnetic flux flowing through the first connection part and the second connection part of the magnetic core is reduced. Consequently, the AC magnetic flux flowing through each part of the magnetic element may be controllable, and the magnetic element can be designed in a simplified manner. In such way, the magnetic element is suitable for mass production while maintaining the performance consistency.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A magnetic element, comprising:

a magnetic core comprising at least one first magnetic leg, a second magnetic leg and a third magnetic leg, wherein each of the at least one first magnetic leg is wound with an excitation winding, a vector sum of magnetic flux passing through each of the at least one first magnetic leg is a first magnetic flux, a second magnetic flux is passing through the second magnetic leg, and a third magnetic flux is passing through the third magnetic leg; and an auxiliary winding partially or completely wound on the second magnetic leg, wherein the auxiliary winding is configured to clamp the second magnetic flux.

2. The magnetic element according to claim 1, wherein the auxiliary winding is connected with an electromotive force.

3. The magnetic element according to claim 2, wherein the auxiliary winding is connected in parallel with the excitation winding.

4. The magnetic element according to claim 3, wherein the auxiliary winding is all wound on the second magnetic leg.

5. The magnetic element according to claim 3, wherein the auxiliary winding is wound on the second magnetic leg and at least one of the at least one first magnetic leg.

6. The magnetic element according to claim 1, wherein the auxiliary winding is a closed end-to-end coil.

7. The magnetic element according to claim 6, wherein the auxiliary winding is wound on the second magnetic leg and at least one of the at least one first magnetic leg.

8. The magnetic element according to claim 6, wherein the auxiliary winding is wound on the second magnetic leg and the third magnetic leg.

9. The magnetic element according to claim 8, wherein a turn ratio of the auxiliary winding wound on the second magnetic leg to the auxiliary winding wound on the third magnetic leg is 1:1.

10. The magnetic element according to claim 8, wherein the auxiliary is wound on the second magnetic leg and the third magnetic in an 8 shape.

11. The magnetic element according to claim 1, wherein the at least one first magnetic leg is arranged between the second magnetic leg and the third magnetic.

12. The magnetic element according to claim 1, wherein the at least one first magnetic leg comprises one first magnetic leg.

13. The magnetic element according to claim 1, wherein the at least one first magnetic leg comprises two first magnetic legs.

14. The magnetic element according to claim 1, wherein the at least one first magnetic leg comprises three first magnetic legs.

* * * * *